US006331892B1

(12) United States Patent
Green

(10) Patent No.: US 6,331,892 B1
(45) Date of Patent: Dec. 18, 2001

(54) INTERFEROMETER FOR MONITORING WAVELENGTH IN AN OPTICAL BEAM

(75) Inventor: Evan D. H. Green, San Jose, CA (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 09/418,952

(22) Filed: Oct. 15, 1999

Related U.S. Application Data

(60) Provisional application No. 60/104,463, filed on Oct. 16, 1998.

(51) Int. Cl.[7] .................................................... G01B 9/02
(52) U.S. Cl. .......................... 356/451; 356/452; 356/454
(58) Field of Search .................................. 356/451, 452, 356/454, 519

(56) References Cited

U.S. PATENT DOCUMENTS

| 3,967,211 | 6/1976 | Itzkan et al. . |
| 4,053,231 | * 10/1977 | Fletcher et al. ....................... 356/510 |
| 4,309,671 | 1/1982 | Malyon . |
| 4,426,155 | * 1/1984 | Monchalin ............................ 356/452 |
| 4,839,614 | 6/1989 | Hill et al. . |
| 5,172,185 | 12/1992 | Leuchs et al. . |
| 5,185,643 | 2/1993 | Vry et al. . |
| 5,305,330 | 4/1994 | Rieder et al. . |
| 5,331,651 | 7/1994 | Becker et al. . |
| 5,349,440 | 9/1994 | DeGroot . |
| 5,373,515 | 12/1994 | Wakabayashi et al. . |
| 5,387,974 | 2/1995 | Nakatuni . |
| 5,420,687 | 5/1995 | Kachanov . |
| 5,438,579 | 8/1995 | Eda et al. . |
| 5,543,916 | 8/1996 | Kachanov . |
| 5,583,638 | 12/1996 | Cutler . |
| 5,631,736 | 5/1997 | Thiel et al. . |
| 5,760,391 | 6/1998 | Narendran . |
| 5,825,792 | 10/1998 | Villenueve et al. . |

FOREIGN PATENT DOCUMENTS

62242378 * 10/1987 (JP) .

* cited by examiner

Primary Examiner—Samuel A. Turner
(74) Attorney, Agent, or Firm—Robert C. Hall; Bozicevic, Field & Francis, LLP

(57) ABSTRACT

An interferometer and related methods for wavelength monitoring are disclosed. The interferometer may be used for the wavelength monitoring or as part of a wavelength feedback and control circuit for an optical signal source. The device operates by creating an output beam on which constructive and destructive optical interference may be detected. The optical interference is generated by a monochromatic beam split into a first beam traversing a stationary path and a second beam traversing a path of variable length. The first and second beams are then recombined to create constructive/destructive interference which may be measured by a detector and correlated with a processor to determine the output wavelength of the optical source. The maximum and minimum of the variable path length are precisely controlled due to use of a micro-positionable semiconductor retroreflector or mirror. Using the known oscillations of the retroreflector measured along the path of the second beam, the wavelength of optical signal source can be precisely and repetitively determined during each oscillation of the retroreflector.

21 Claims, 16 Drawing Sheets

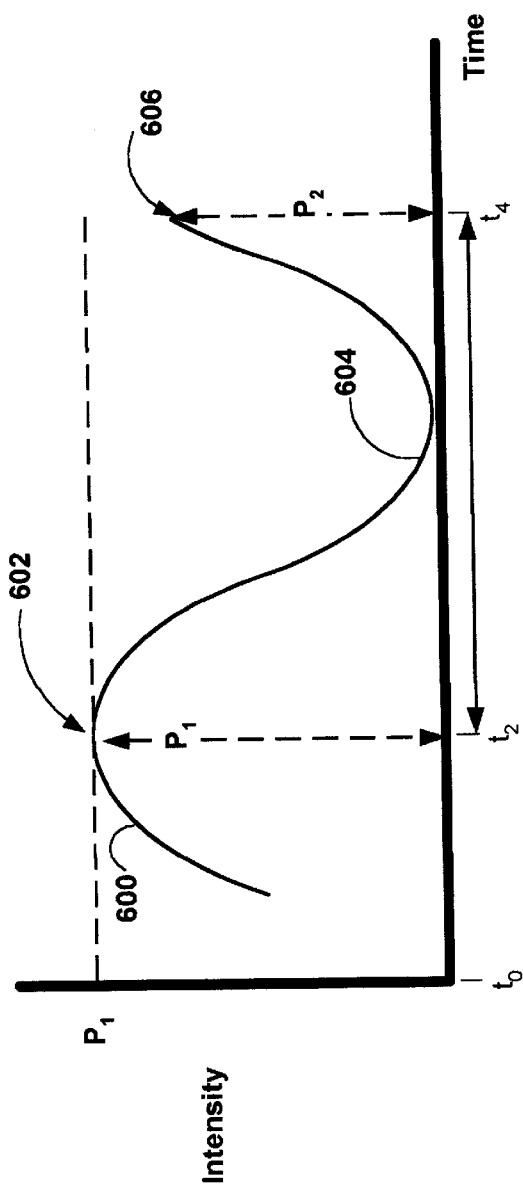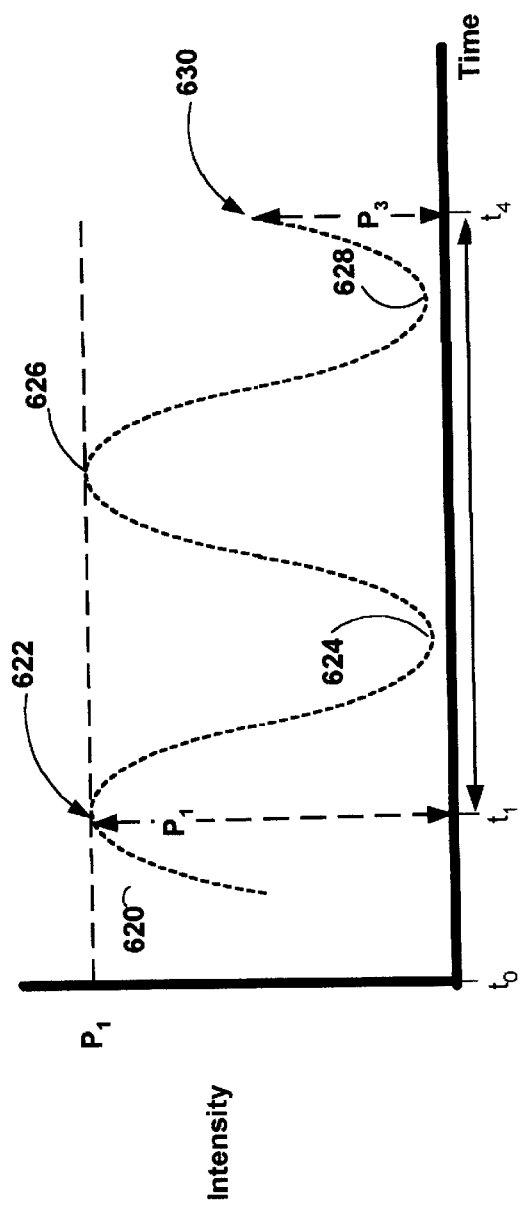

FRINGE PATTERN

INTERFEROMETER FOR MONITORING WAVELENGTH IN AN OPTICAL BEAM

CROSS-REFERENCE TO RELATED APPLICATION

This application claims the benefit of prior filed co-pending Provisional Application No. 60/104,463 filed on Oct. 16, 1998 and is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to wavelength monitoring devices for measurement, control, or locking of optical signal generators and related components.

2. Description of the Related Art

Optical wavelength monitors are needed in a wide range of applications ranging from telecommunications to test and measurement. Optical wavelength monitors perform a wide range of functions. In the laboratory or during assembly of optical components they may include both measurement and display capability. In telecommunications applications they may be part of a closed loop control circuit for locking or tuning an optical signal source and related components. Typically such systems are expensive, and may additionally have a large form factor. Their accuracy may be affected by power fluctuations and noise levels in the optical beam.

What is needed is an optical wavelength monitor with small form factor, low cost, and tolerance for the power fluctuations and noise levels typically associated with optical signal generators.

SUMMARY OF THE INVENTION

Interference elements are disclosed for measurement of wavelength in optical devices. They may be used for display, monitoring, control or locking of optical signal sources. They may be used to determine relative and absolute wavelength variations in an optical beam.

In an embodiment of the invention an apparatus for monitoring wavelength in an optical beam generated by an optical source is disclosed. The optical source includes: an interference element, detectors, and logic. The interference element is positioned in the path of the optical beam to generate a periodic fringe pattern. The detectors are located within the generally periodic fringe pattern to generate signals corresponding to the intensities of the fringe pattern at a plurality of locations. The logic is coupled to the detectors for [iteratively] sampling two selected pairs of the signals generated by the detectors, for determining a ratio of the differences of the two selected pairs of the signals, and for comparing a current ratio with a prior ratio to detect a variation in the wavelength of the optical beam generated by the optical source.

In an embodiment of the invention the apparatus for monitoring wavelength includes: an interference element, detectors and logic. The interference element is positioned in tie path of the optical beam to generate a generally periodic fringe patter. The detectors are located within the generally periodic fringe pattern to generate signals corresponding to the intensities of the fringe pattern at a plurality of locations. The logic is coupled to the detectors for sampling two selected pairs of the signals generated by the detectors, for determining a ratio of the differences of the two selected pairs of the signals, and for calculating the wavelength of the optical beam based on parameters which correlate the ratio with wavelength.

In an embodiment of the invention the apparatus for monitoring wavelength in an optical beam comprises: a beam splitter, a stationary reflector; a movable reflector; a detector; and logic. The beam splitter is positioned in the path of the optical beam to split the optical beam into a first and a second beam. The stationary reflector is positioned in an optical path of the second beam. The movable reflector oscillates over a known distance along an optical path of the first beam to vary an optical path length of the first beam. The detector detects interference fringes generated by a combination of a portion of the first beam reflected by the movable reflector and a portion of the second beam reflected by the stationary reflector, and generates an AC signal corresponding thereto. The logic samples the AC signal and determines at least one of a relative wavelength and an absolute wavelength of the optical beam based on the AC signal and the known distance of the reflector.

In another embodiment of the invention the apparatus for measuring wavelength in an optical beam comprises:

means for generating a generally periodic fringe pattern of the optical beam;

means for generating signals corresponding to intensities of the generally periodic fringe pattern at a plurality of locations; and logic coupled to the means for generating for sampling two selected pairs of the signals, for determining a ratio of the differences of the two selected pairs of the signals, and for comparing a current ratio with a prior ratio to detect a variation in the wavelength of the optical beam generated by the optical source.

In still another embodiment of the invention the apparatus for monitoring wavelength in an optical beam includes:

means for splitting optical beam into a first and a second beam;

means for reflecting the second beam;

means for varying an optical path length of the first beam by a known distance;

means for detecting interference fringes generated by a combination of a portion of the first beam reflected by the means for varying and a portion of the second beam reflected by the means for reflecting, and to generate an AC signal corresponding thereto; and means for sampling the AC signal and determining at least one of a relative wavelength and an absolute wavelength of the optical beam based on the AC signal and the known distance of the means for varying the optical path length.

In another embodiment of the invention a method for monitoring a wavelength in an optical beam is disclosed. The method comprises the acts of;

generating a generally periodic fringe pattern of the optical beam;

generate signals corresponding to the intensities of the fringe pattern at a plurality of locations;

sampling two selected pairs of the signals generated in the act of generating signals;

determining a ratio of the differences of the two selected pairs of the signals;

comparing a current ratio with a prior ratio to detect a variation in the wavelength of the optical beam generated by the optical source.

In another embodiment of the invention the method for monitoring comprises the acts of:

splitting optical beam into a first and a second beam;

varying an optical path length of the first beam by a known distance;

detecting interference fringes generated by a combination of a portion of the first beam and the second beam;

generating an AC signal corresponding to a level of the interference fringes detected in the act of detecting;

sampling the AC signal; and determining at least one of a relative wavelength and an absolute wavelength of the optical beam based on the sampling of the AC signal in the sampling act and the known distance of the optical path length in the varying act.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 6A–6B show two examples of signal intensity as a function of time as determined by either of detectors 108, 330 shown in, respectively, FIGS. 1, 3.

DETAILED DESCRIPTION OF THE INVENTION

Figure 1:
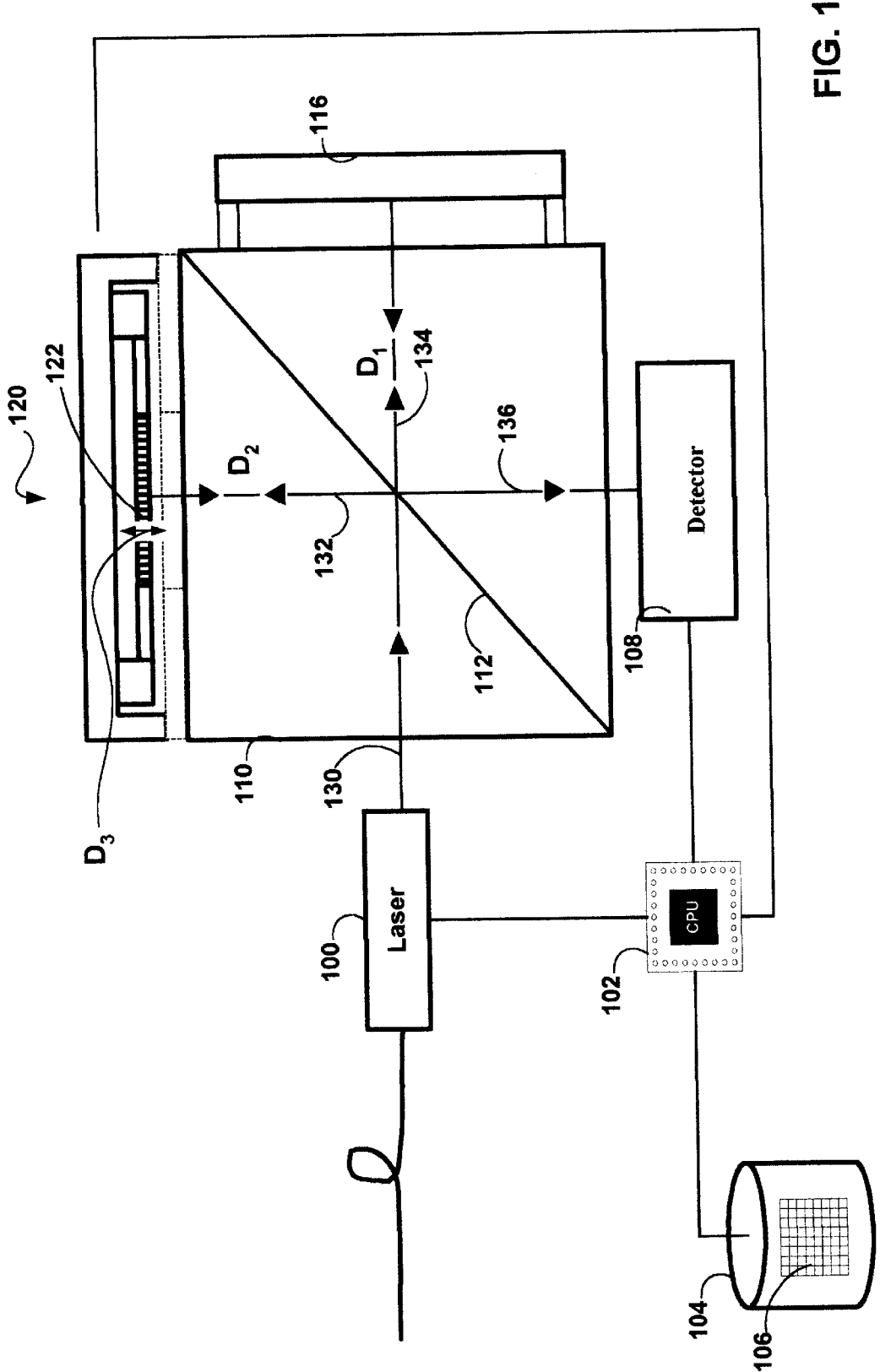
FIG. 1 is a hardware block diagram of an optical system utilizing a scanning interferometer for wavelength measurement.

FIG. 1 is a hardware block diagram of an optical system utilizing a scanning interferometer for wavelength measurement. The interferometer may be used for the wavelength monitoring or as part of a wavelength feedback and control circuit for an optical signal source. The device operates by creating an output beam on which constructive and destructive optical interference may be detected. The optical interference is generated by a monochromatic beam split into a first beam traversing a stationary path and a second beam traversing a path of variable length. The first and second beams are then recombined to create constructive/destructive interference which may be measured by a detector and correlated with a processor to determine the output wavelength of the optical source. The maximum and minimum of the variable path length are precisely controlled due to use of a micro-positionable semiconductor retroreflector or mirror. Using the known oscillations of the retroreflector measured along the path of the second beam, the wavelength of optical signal source can be precisely and repetitively determined during each oscillation of the retroreflector using the following equation:

$$\text{Equation 1: } \lambda = \frac{2 \cdot \text{Oscillation\_Distance}}{\#\text{Peaks\_Detected}}$$

The oscillation distance generated by the micro-positionable retroreflector 122 is measured parallel to beam 132. The mirror movement may be linear or arcuate. Unlike prior art devices, no reference beam is required to determine optical wavelengths of the source. Additionally, because of the low mass of the semiconductor retroreflector, its oscillation can occur at a high frequency. This allows rapid repetitive sampling of the optical source.

The system shown in FIG. 1 includes: laser 100, beam splitter 110, micro-positionable semiconductor retroreflector 120 with an oscillating retroreflector 122, fixed retroreflector 116, detector 108, processor 102, and memory 104. An output beam 130 from the laser 100 strikes a partially reflecting inclined surface 112 of the beam splitter. Part of the beam is reflected along path 132 and part is transmitted along path 134. The transmitted portion 134 passes through the partially reflective inclined surface striking fixed retroreflector 116. The stationary retroreflector reflects the beam back to the inclined surface where it is again reflected along path 136 where it strikes detector 108. A reflected portion of beam 130 passes along path 132 where it strikes the oscillating retroreflector 122. The retroreflector returns the beam to the partially reflective inclined surface, where the beam is transmitted to the detector along path 136 as well. Both the variable path length beam and the stationary path length beam share a common path 136. The beams constructively and destructively interfere with one another along this path. This results in variations in optical intensity which can be measured by detector 108. These intensity variations are passed to processor 102. The processor 102 is coupled to the micro-positionable semiconductor retroreflector 120 and may control the oscillations of the retroreflector. Using program code 106 stored in memory 104 (See FIGS. 8–9) the processor samples the intensity variations from the detector. Using the known oscillation of the micro-positionable retroreflector 122, the processor computes the wavelength of beam 130 from the laser. The processor, in an embodiment of the invention, may be coupled to the laser. The laser may, in this embodiment of the invention, be tuned by at least one of: current, temperature, or by mechanical positioning of a tuning element, e.g., etalon, grating, retroreflector, etc. In his embodiment the processor may implement feedback control of the output wavelength of the laser. The laser may be locked on a selected wavelength or maybe tuned across a wavelength range.

Figure 2:
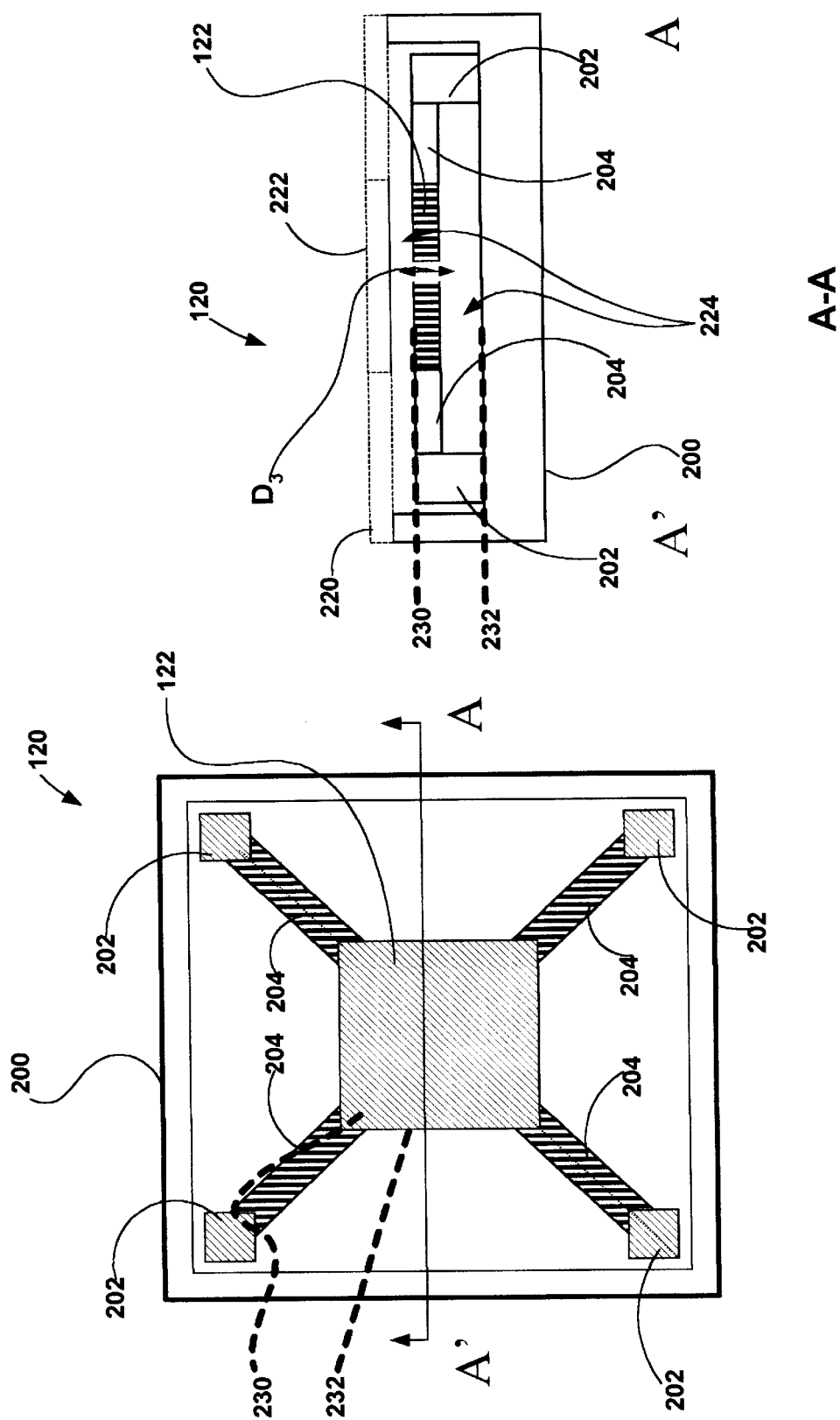
FIG. 2 is a detailed diagram of the micro-positionable semiconductor chip 120 shown in FIG. 1

FIG. 2 is a detailed diagram of the micro-positionable semiconductor chip 120 shown in FIG. 1. The device includes: retroreflector 122, flexible support arms 204, support posts 202, and base 200. Electrical connections 230–232 are provided to retroreflector 122 and base 200. The retroreflector is moved by the attraction and/or repulsion between electrical charges on conductive surfaces of the retroreflector and the base. These charges are induced by the application of a voltage on signal lines 230–232. The voltage may be imposed by processor 102 (See FIG. 1) or by an oscillator circuit, e.g., an L-C circuit directly coupled to the chip. Using novel control processes set forth in FIGS. 8–9 and the accompanying text, minute movements of the retroreflector are utilized to measure the wavelength of an optical source. The retroreflector may be completely encased within a semiconductor package by an end cap affixed to the base. The end cap includes an optically transparent window 222 which allows for the transmission of an optical beam to and from the retroreflector 122. An air gap 224 is defined on either side of the retroreflector within the housing formed by end cap 220 and base 200. Thus, the retroreflector is free to oscillate within the housing formed by the end cap and base.

The micro-positionable semiconductor chip 120 may be fabricated using techniques well known to those skilled in the art. Anisotropic etch back may be used to define the air gaps 224 which surround the retroreflector. The retroreflector may include a planar surface. In an alternate embodiment of the invention the retroreflector may be fabricated as a corner cube, dihedral prism, etc. Silicon alone may provide sufficient reflectivity for the retroreflector. Alternately, where an increase in reflectivity is desired, the retroreflector may be fabricated from a metal layer either alone or on a semiconductor substrate. The chip may include numerous geometries for the retroreflector and support members, e.g., posts 202 and support arms 204. The retroreflector may be supported in a manner which provides for either linear or arcuate movement without departing from the scope of the claimed invention. An arcuate embodiment of the micro-position double retroreflector is shown in the integrated device shown in the following FIGS. 3–5 and accompanying text.

Figure 3:
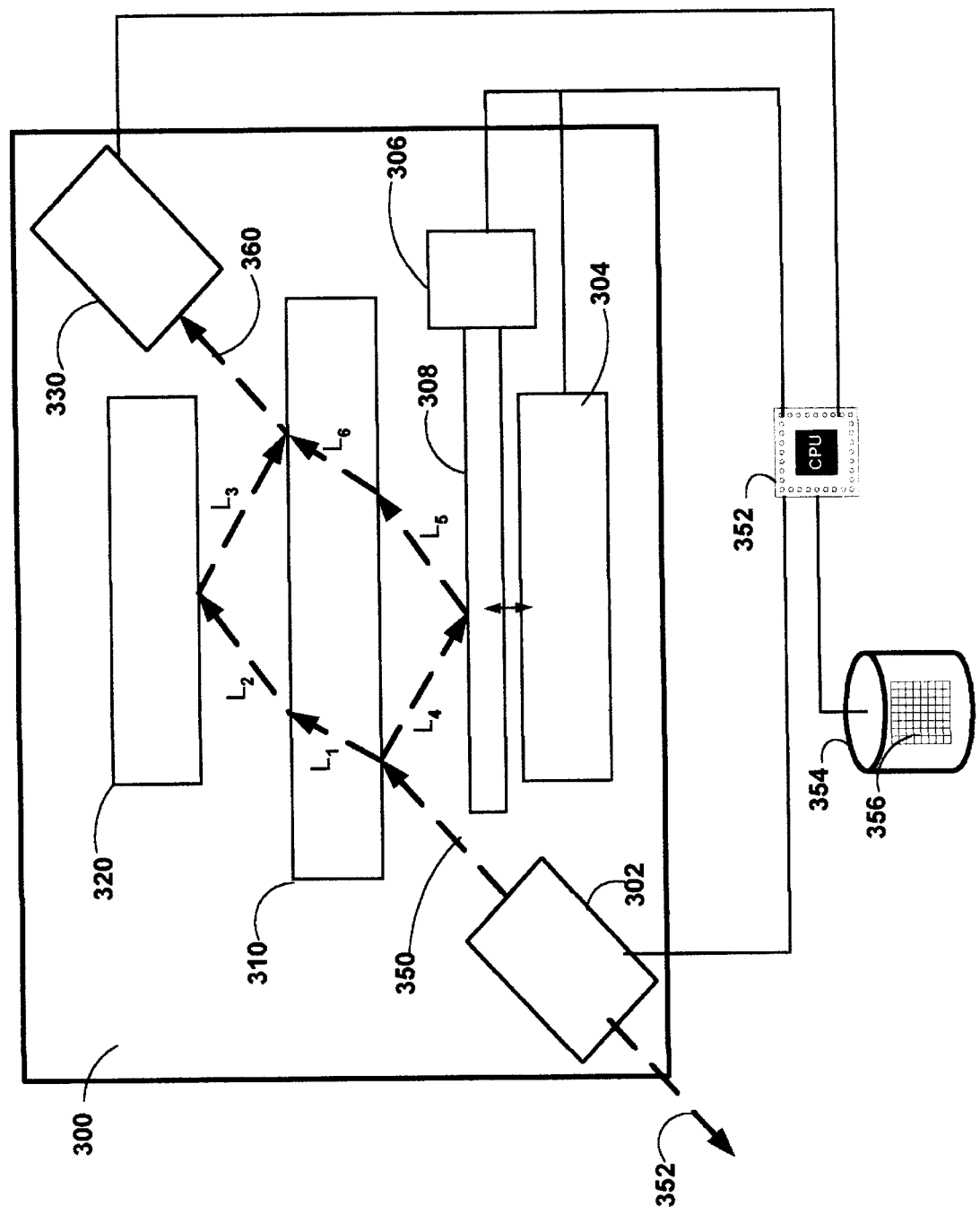
FIG. 3 shows an alternate embodiment of the invention in which the scanning interferometer as well as a semiconductor laser and optical detector are fabricated on a single semiconductor chip 300.

FIG. 3 shows an alternate embodiment of the invention in which the scanning interferometer as well as a semiconductor laser and optical detector are fabricated on a single semiconductor chip 300. Semiconductor lasers may be utilized in a wide range of applications including telecommunications as well as test and measurement. Semiconductor lasers may be tuned using an external cavity with a tuning source to vary the feedback wavelength to the laser. Alternately, they may be tuned by temperature or current. The semiconductor lasers in this latter category include lasers used for wavelength division multiplexed (WDM) telecommunication applications. In telecommunication applications, the precision with which the center wavelength of the laser may be controlled or locked determines the density at which optical multiplexing can be accomplished. In both of these applications the combined scanning interferometer and laser may provide a single chip solution for optical signal generation as well as wavelength control.

FIG. 3 shows such a system on a single chip. A scanning interferometer, detector, and laser are fabricated on a single chip 300. The chip includes: semiconductor laser 302, reflector actuation base 304, micro-positionable reflector 308, support post 306, beam splitter 310, stationary reflector 320 and detector 330. A processor 352 and memory 354 are also shown. In an embodiment of the invention, the processor and memory may be fabricated as part of the chip 300. In another embodiment of the invention they may be fabricated separately from the chip and subsequently connected to it. The processor 352 couples to the laser 302, the detector 330, and the micro-positionable reflector assembly, i.e., micro-positionable reflector 306, support post 308 and reflector situation bass 304.

In operation, an output beam 350 from a facet of the semiconductor laser strikes the beam splitter 310 and is split into two beams. A first of these beams passes along paths $L_{1\text{-}2}$ and strikes stationary reflector 320. The stationary reflector may be fabricated from a semiconductor substrate, from a metal layer on the substrate, or from a metal layer alone. From the stationary reflector, the beam is reflected along path $L_3$ to the beam splitter 310, where it is again reflected along path 360 to detector 330.

A second portion of beam 350 is reflected along a path of variable length by beam splitter 310. That beam initially passes along path $L_4$ which contacts the micro-positionable reflector 308. The beam is reflected along path $L_{5\text{-}6}$ through the beam splitter where it combines with the stationary path length beam along common path 360 to strike the detector 330.

The attraction and/or repulsion of electrical charges applied to the micro-positionable reflector 308 and the reflector actuation base 304 results in deflection of the micro-positionable reflector toward or away from the beam splitter. Thus, both the initial path $L_4$ and the reflected path $L_5$ of the beam vary in length during oscillation of the micro-positionable reflector. The stationary and variable path length beams pass along common path 360 to the detector 330. The beams are slightly displaced from each other by the motion of the micro-positionable reflector, but substantially overlap at the detector. The detector senses variations in the intensity of the received beams resulting from their constructive and destructive interference. This interference is brought about by, as discussed above, the movement of the micro-positionable reflector. This movement is precisely known. It may be precisely controlled by the processor 352. The processor implementing program code 356 stored in memory 354 determines the output wavelength of the laser and varies or locks the output wavelength of the laser 302 using any one or all of: current, temperature and/or mechanical tuning, to tune the laser 302.

In an alternate embodiment of the invention, the detector 330 may be replaced by a suitable interface for coupling the beam 360 to an external detector. The coupling may include a fiber optic. Similarly the laser 302 may be external to the chip. In this embodiment the output beam would be coupled to the scanning interferometer. The coupling may include a fiber optic.

Figure 4:
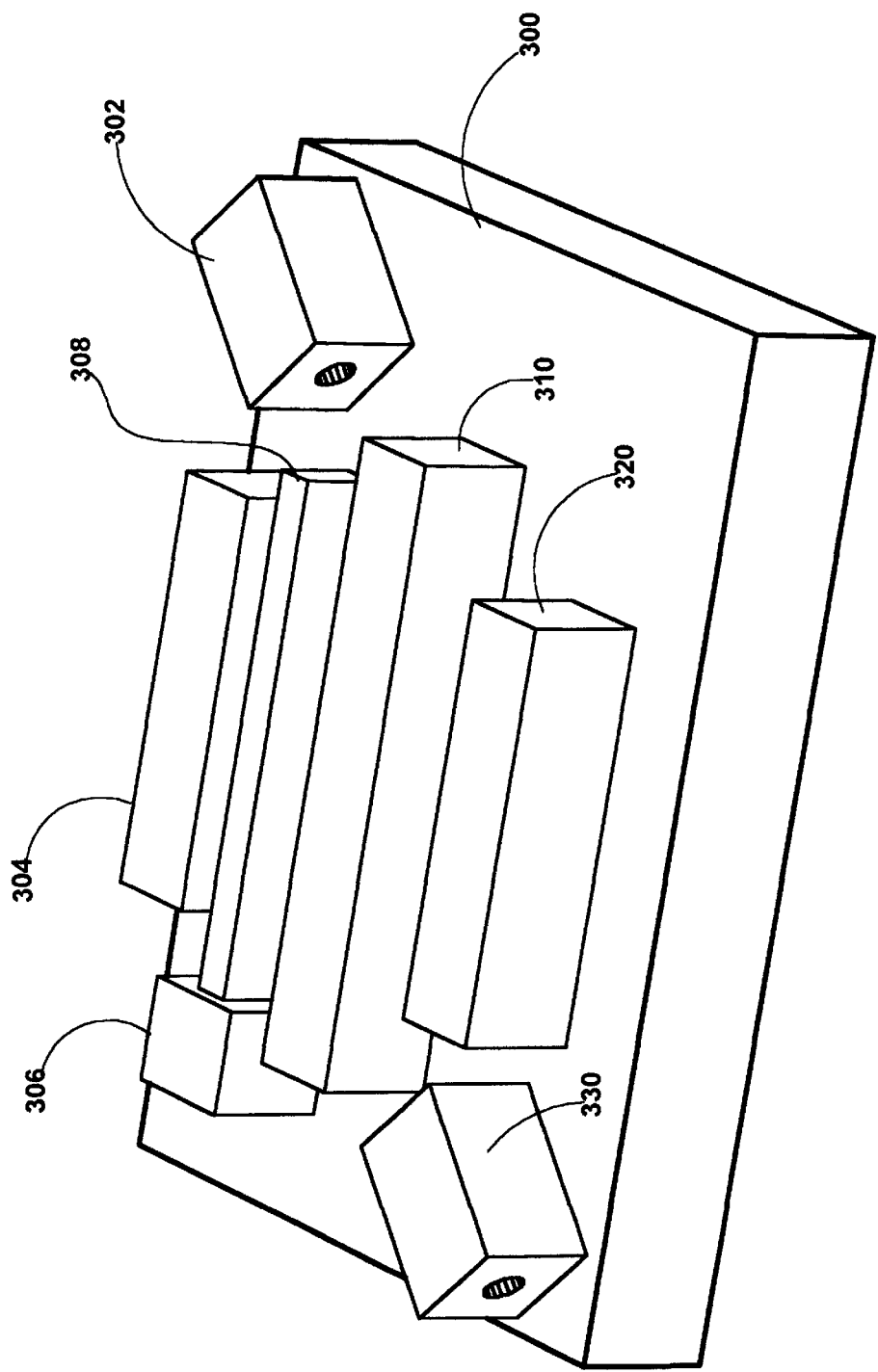
FIGS. 4–5 show isometric side views of the combined scanning interferometer and diode laser shown in FIG. 3.
Figure 5:
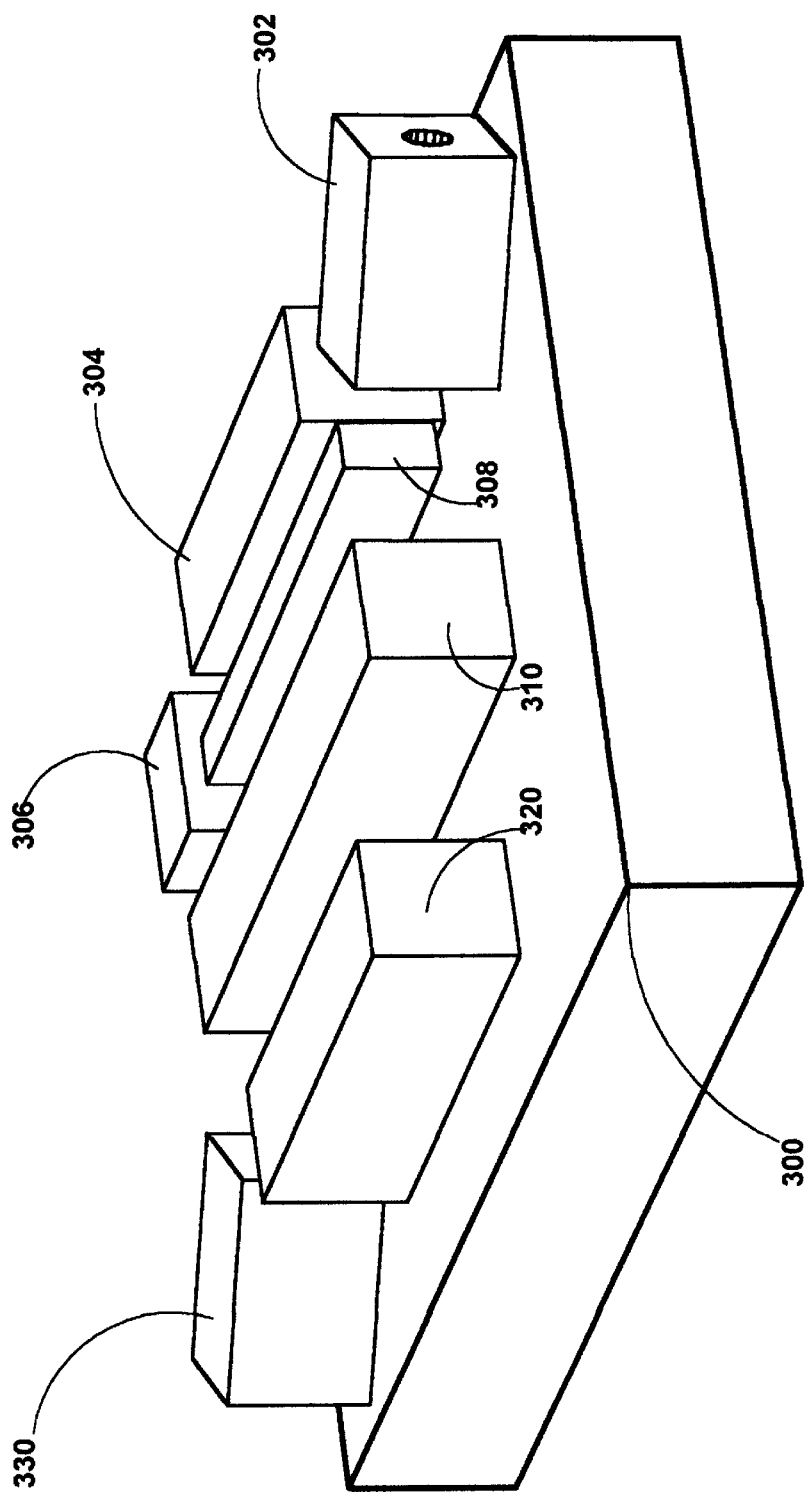

FIGS. 4–5 show isometric side views of the combined scanning interferometer and diode laser shown in FIG. 3.

FIGS. 6A–B show two examples of signal intensity as a function of time as determined by either of detectors 108, 330 shown in, respectively, FIGS. 1, 3. In FIG. 6, scanning begins at a time to and proceeds through time $t_4$. During that time interval the retroreflector on the scanning interferometer moves a known distance. That distance may be used in combination with processes shown in FIG. 8 to determine the number of peaks detected to determine the output wavelength of the laser (See Equation 1). In FIG. 6A, a waveform 600 of measured intensity of the combined stationary and variable path beams is shown. The waveform reaches a peak 602 with intensity $P_1$ at time $t_2$. At the end of the observation interval corresponding, for example, to limit of retroreflector travel, a partial peak 606 with intensity $P_2$ at time $t_4$ is observed.

As will be discussed in connection with the following FIG. 8, the processor determines the distance traveled by the micro-positionable retroreflector/reflector over the measurement interval between observation of the first peak and the limit, i.e., $t_4$ minus $t_2$. The distance determination may be made to a first order of accuracy by multiplying the total distance traveled by the retroreflector during the interval $t_0$–$t_4$ by the ratio $t_4$–$t_2/t_4$–$t_0$. More accurate determination of the distance traveled by the micro-positionable retroreflector/reflector may result from either a lookup table or function which correlates the velocity profile of the mirror over the time between $t_0$–$t_4$. Next, the processor determines the number of peaks observed during the sampling interval $t_2$–$t_4$ which, in this embodiment, begins with the first peak observed. This calculation involves a counting of the peaks, or fractional parts thereof, observed over the measurement interval. Each peak-valley is counted as one-half a peak, while each valley-valley or peak-peak is counted as one peak. Fractional parts of peaks will also be computed. Thus in FIG. 6A one-half peak is observed from peak 602 to valley 604 and a fractional peak is observed between valley 604 and partial peak 606. The magnitude of the fractional peak is calculated by Equation 2.

Equation 2:

$$fraction = \frac{\cos^{-1}\left(\frac{P_2}{P_1}\right)}{\pi} \text{ if intensity } P \text{ is decreasing at } t_4 \text{ or}$$

$$fraction = \frac{\sin^{-1}\left(\frac{P_2}{P_1}\right)}{\pi} \text{ if intensity } P \text{ is increasing at } t_4$$

For the sake of example, if the ratio of ($P_2/P_1$) is 0.8 and P is increasing at time $t_4$, the number of peaks observed in the example shown in FIG. 6A is ½+$\sin^{-1}$(0.8)/$\pi$≅0.8. This number along with the computed distance traveled is substituted into Equation 1 to generate a solution for the absolute wavelength of the laser beam during the sampling interval.

In FIG. 6B a waveform 620 with a different periodicity than that of FIG. 6A is shown. The sampling interval again begins at time $t_0$. Not until time $t_1$ is a peak 622 with an intensity level $P_1$ observed. During the measurement interval $t_1$–$t_4$ the number of peaks observed is: one-half between peak 622 and valley 624; one from valley 624 to valley 628; and $\sin^{-1}(P_3/P_1)/\pi$ from valley 628 to partial peak 630.

The processor implementing processes discussed partially above, and in detail in the following FIG. 8, can determine the output wavelength of the laser using the number of peaks measured and the distance traveled in Equation 1.

Figure 7:
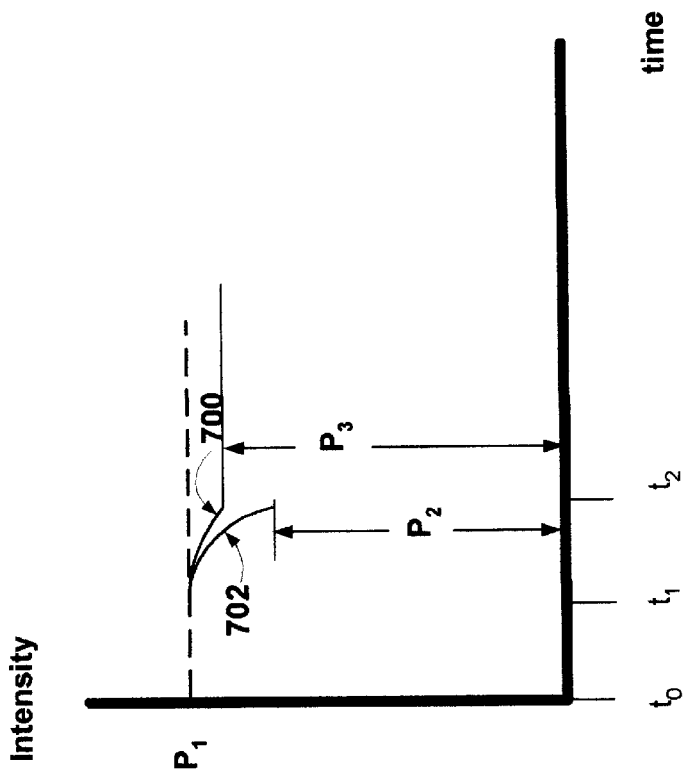
FIG. 7 shows two intensity profiles 700, 702 as measured at either of detectors 108, 330 (See FIGS. 1, 3).

FIG. 7 shows two intensity profiles 700–702 as measured at either of detectors 108, 330 (See FIGS. 1, 3). Only partial peak measurement is required to determine the laser output wavelengths which correspond with the interference intensity profiles 700–702. Unlike the embodiment shown in FIGS. 6A–B and FIG. 8, it is not necessary to wait during the observation interval until the first peak is detected. Instead, measurement begins at a fixed point along the oscillation path of the micro-positionable retroreflector/reflector. That point is the point at which optical path lengths $D_1$ and $D_2$ for the split beams 132–134 (See FIG. 1) are equal. This unique geometry assures that for any measured wavelengths there will be a peak intensity resulting from constructive interference of the combination of the split beams at the input to the detector within the observation interval and at the onset of the sampling interval. Since the peak power, e.g., $P_1$ is known, and measured at the start of the sampling interval, the number of peaks generated over the sampling interval is uniquely related to the ratio of the intensity observed at the end of the sampling interval divided by the intensity at the onset of the sampling interval, as governed by Equation 2. This fractional number may be substituted into Equation 1 along with the known distance traveled by the retroreflector during the sampling interval to solve for output wavelength of the laser during the sampling interval.

In FIG. 7 the observation interval is initiated by the processor at time to. At time $t_1$, the optical path lengths of the split beams are equal and the sampling interval begins. At the start of the sampling interval $t_1$, the constructive interference of the split beams is at a maximum intensity $P_1$, well above any noise level associated with the optical beam. At the end of the sampling interval $t_2$, waveform 700 has a final power level $P_3$. The number of partial peaks observed is $P_3/P_1$.

$$\cos^{-1}\left(\frac{P_3}{P_1}\right)/\pi$$

At the end of the sampling interval $t_2$, waveform 702 has a final power level $P_2$. The number of partial peaks observed is $P_2/P_1$.

$$\cos^{-1}\left(\frac{P_2}{P_1}\right)/\pi$$

In an alternate embodiment of the invention in which locking of the laser at a specific wavelength is desired, the above-mentioned requirement as to equality of optical path length may be less restrictive. In this case, the requirement need only be that the optical path lengths $D_1$, $D_2$ be equivalent to integer half wavelength multiples of the center wavelength at which locking is to occur.

In another alternative embodiment of the invention, computational techniques such as look-up tables or signal pattern matching may be employed to determine the fractional peak count.

Figure 8:
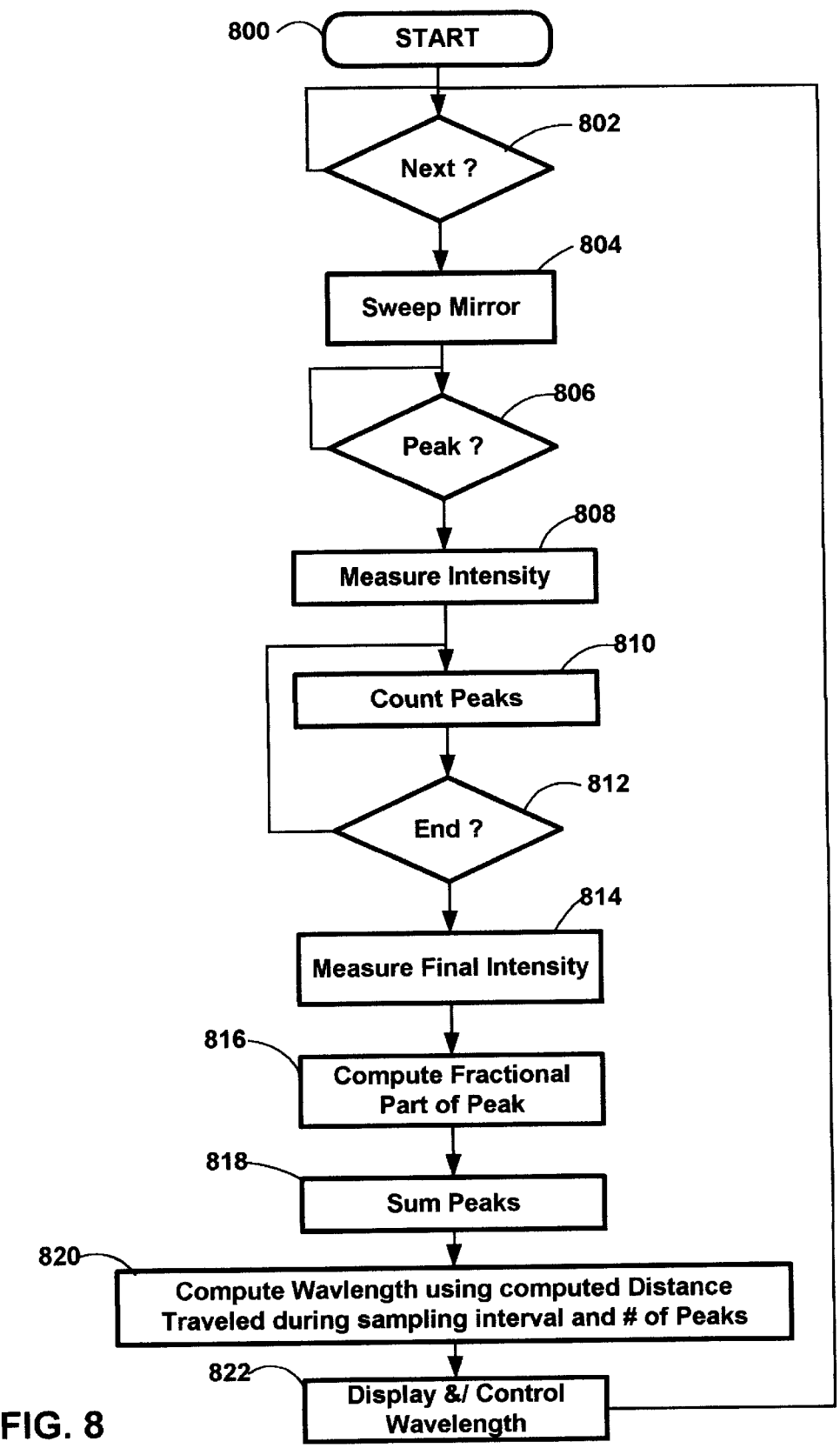
FIG. 8 shows the processes associated with wavelength determination through peak detection as introduced in FIGS. 6A–6D.

FIG. 8 shows the processes associated with wavelength determination through peak detection as introduced in FIGS. 6A–B. Processing begins at start block 800. In start block 800, parameters which correlate the distance traveled by the retroreflector as a function of time are uploaded by the processor. Next, control is passed to decision block 802. In decision block 802 a determination is made as to when the next observation interval will be initiated. When the observation interval begins, control is passed to process 804. In process 804 the retroreflector movement is initiated, thereby varying the optical path length of one of the split beams with a resultant constructive and destructive interference patterns measured by the detector. Control is then passed to decision process 806. In decision process 806 the processor and detector in combination determine when an intensity peak resulting from the constructive interference of the variable and stationary path length beams is experienced. When such a peak is detected, the sampling interval begins and control is passed to process 808. In process 808 the amplitude of the intensity profile is measured by the detector and processor. Control is passed to process 810. In process 810 counting and cumulating of peak count is initiated. This involves, as discussed above, each peak-valley and valley-peak transition being accorded a value of one-half. Control is then passed to decision process 812 in which a determination is made as to whether the sampling interval, e.g., the limit of retroreflector travel has ended. Control is then passed to process 814. In process 814 the final measured intensity at the end of the sampling interval is determined. Control is then passed to process 816. In process 816 a fractional peak magnitude is computed using the ratio of the measured intensity at the end of the sampling interval and the peak intensity measured in process 808. Control is then passed to process 818. In process 818 the fractional peak computed in process 816 is added to the cumulative peak count computed in process 810. Control is then passed to process 820. In process 820 a wavelength of the optical source during the sampling interval is computed by substituting the total peak count and the computed distance traveled by the retroreflector into Equation 1. The computation of distance traveled by the retroreflector is a two step process. First, the sampling interval is computed either independently or as a fractional part of the observation interval. Then using the parameters uploaded in start process 800, the distance traveled by the retroreflector during the sampling interval is computed. Control is then passed to process 822. In process 822 the computed wavelength is displayed or utilized for wavelength locking and/or control in feedback processes well known to those skilled in the art. Control than returns to decision process 802 for detection of the onset of the next sampling interval.

In an alternative embodiment of the invention, fractional peaks are determined at both the start and end of the range of motion of the micro-positionable retroreflector/reflector.

In an alternate embodiment of the invention, the sampling interval begins at ascertainable intensity levels other than peak levels, e.g., valleys. Some accuracy may be sacrificed in doing so since valley detection accuracy will be influenced by background noise levels of the laser and associated circuitry. In an alternate embodiment of the invention the processor controls the retroreflector directly by the application of control signals. In still another embodiment of the invention the retroreflector is independently controlled by, for example, an L-C circuit. In such an embodiment, the processor determines the onset of the sampling interval and the end of the sampling interval by synchronizing its processes with the oscillations of the retroreflector.

Figure 9:
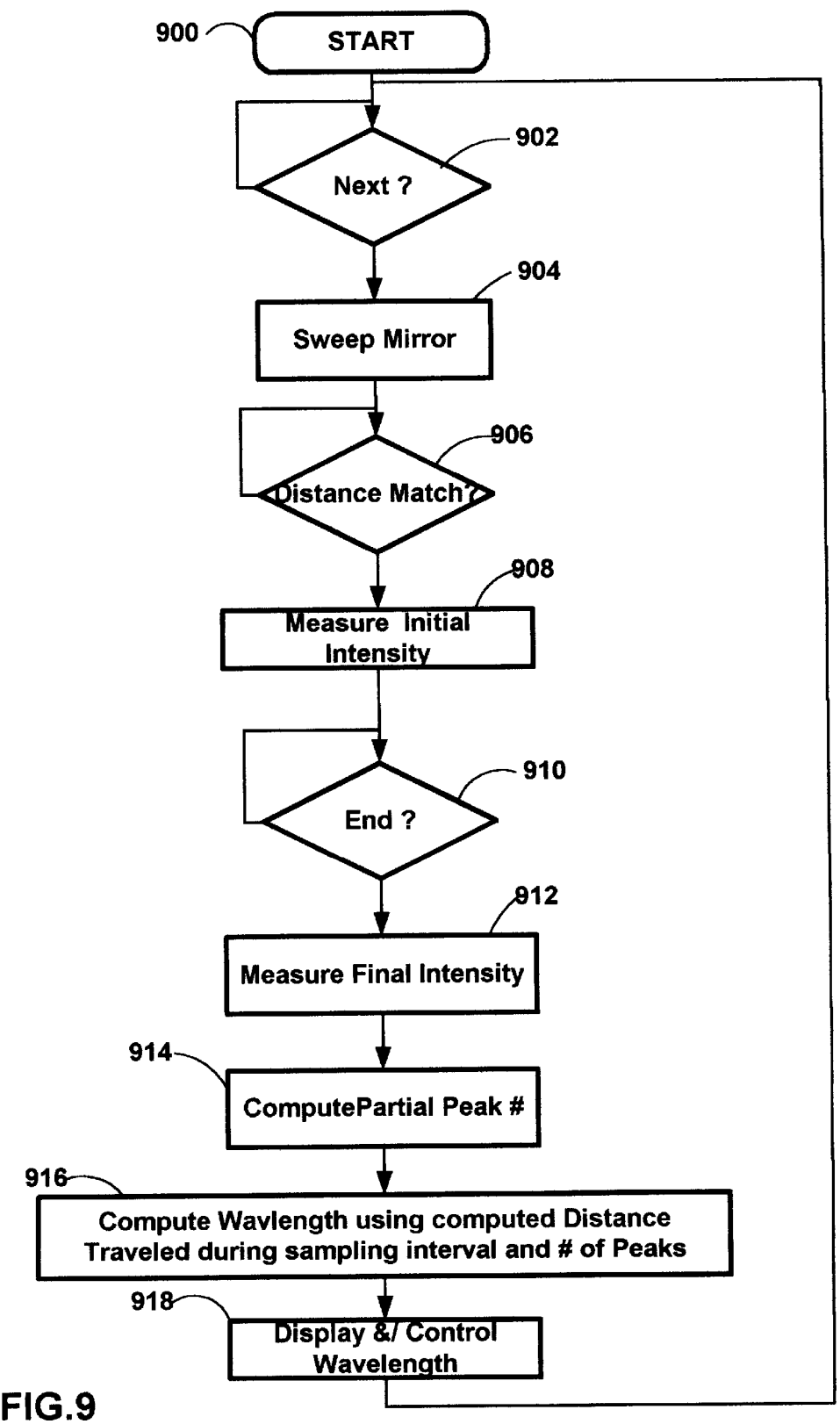
FIG. 9 shows the processes associated with wavelength determination through peak detection as introduced in FIG. 7.

FIG. 9 shows the processes associated with wavelength determination through peak detection as introduced in FIG. 7. Processing begins at start block 900. In start block 900, parameters which correlate the distance traveled by the retroreflector as a function of time are uploaded by the processor. Next, control is passed to decision block 902. In decision block 902 a determination is made as to when the next observation interval will be initiated. When the observation interval begins, control is passed to process 904. In process 904 the retroreflector, e.g., mirror movement is initiated thereby varying the optical path length of one of the split beams with a resultant variation in the interference pattern detected by the detector. Control is then passed to decision process 906. In decision process 906 the processor determines the onset of the sampling interval. The onset of the sampling interval corresponds, as discussed above in connection with FIG. 7, to the point at which the split path lengths are equal, or in the case of wavelength locking applications, equal to integral half wavelength multiples of one another. The determination may be made using a known time during the measurement interval at which the path lengths are equal. Alternately, a known activation signal level applied to the retroreflector may be utilized to signal the time at which optical path lengths on the split beams are equal. Control is then passed to process 908. In process 908 the amplitude of the intensity profile is measured by the detector and processor. Control is passed to process 910. In decision process 910 a determination is made as to whether the sampling interval, e.g., the limit of retroreflector travel has ended. Control is then passed to process 912. In process 912 the final measured intensity at the end of the sampling interval is determined. Control is then passed to process 914. In process 914 a fractional peak magnitude is computed using the ratio of the measured intensity at the end of the sampling interval to the peak intensity measured in process 908 to compute the fractional peak number as indicated in Equation 2. Control is then passed to process 916. In process 916 the fractional peak computed in process 914 is used to compute the optical wavelength of the optical source during the sampling interval. This wavelength is computed by substituting the fractional peak count and the computed distance traveled by the retroreflector into Equation 1. The computation of distance traveled by the retroreflector may be a two step process. First, the sampling interval is computed either independently or as a fractional part of the observation interval. Then, using the parameters uploaded in start process 900, the distance traveled by the retroreflector during the sampling interval is computed. This distance need only be computed once since, unlike the embodiment shown in FIG. 8, the distance traveled by the retroreflector is constant. Control is then passed to process 918. In process 918 the computed wavelength is displayed or utilized for wavelength locking and/or control in feedback processes well known to those skilled in the art. Control then returns to decision process 902 for detection of the onset of the next sampling interval.

In an alternate embodiment of the invention the processor controls the retroreflector directly by the application of control signals. In still another embodiment of the invention the retroreflector is independently controlled by, for example, an R/L-C circuit. In such an embodiment, the processor determines the onset of the sampling interval and the end of the sampling interval by synchronizing its processes with the oscillations of the retroreflector.

Figure 10:
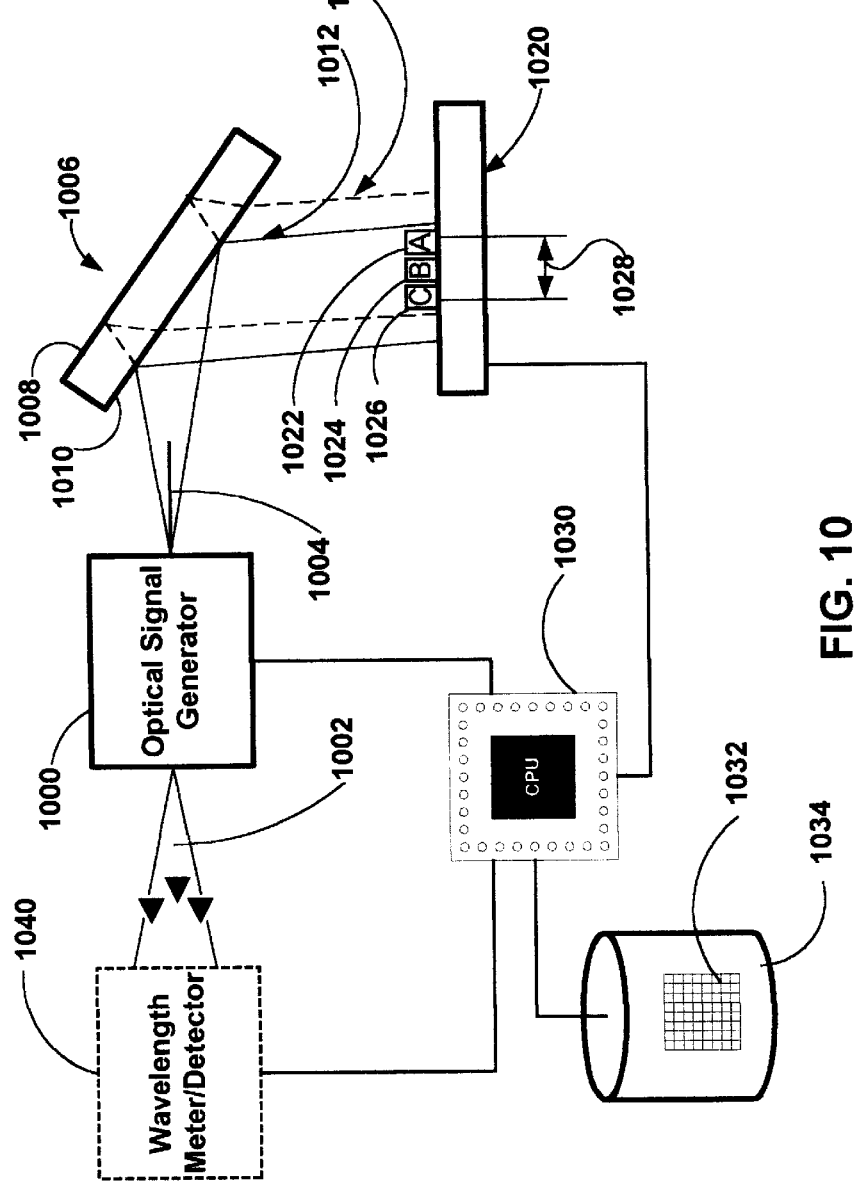
FIG. 10 is a system level diagram of an alternate embodiment of the scanning interferometer for wavelength determination.

FIG. 10 is a system level diagram of an alternate embodiment of the scanning interferometer for wavelength determination. It also may be used for optical signal measurement or for tuning or locking an optical signal source. This device differs from the device shown in FIGS. 1–9 in several respects. First, a stationary interference element is utilized to generate an interference pattern, a.k.a., a fringe pattern. This effect is achieved by multiple surfaces of the interference element which reflect incident radiation. The interference element may be fabricated from an optically transparent material in which the front and back surfaces act as the multiple reflectors. The surfaces of the interference element may optionally be coated to increase or decrease their reflectivity. The interference element may optionally be fabricated with an air-spaced gap between two partially reflective surfaces. As the wavelength of the incident radiation varies, a corresponding movement of the fringe pattern generated by the interference element is exhibited as the two reflected beams travel different distances to reach a particular location on the detector surface. Detectors positioned within the fringe pattern are utilized in combination with the processor to generate signals proportional to the slope of the fringe pattern intensity with respect to distance along the fringe pattern at two distinct locations. The positioning of the detectors will be discussed further in the following FIGS. 13–16. Generally, the detectors are positioned so that the signals from the detectors, in combination with the processor, exhibit a phase shift with respect to one another. This indicates that the detectors are sampling the fringe pattern at distinct locations within the fringe pattern and with the result that the two signals do not simultaneously hold the same value for all wavelengths. The preferred phase shift is approximately 90 degrees, in which case, one slope signal is at zero when the other is at either its positive or negative extreme. When combined with the novel processes disclosed in FIG. 17, the scanning interferometer and processes operate independently of power variations in the laser beam. This is significant, since substantially all methods for tuning a laser including: a current, temperature, and mechanical tuning induce wavelength dependent power variations in the output beam, and also power fluctuations in a laser output are inevitable.

FIG. 10 shows a laser coupled to a scanning interferometer for measurement or control of the output wavelength of the laser. The system includes: an optical signal source 1000, e.g., laser; an interference element 1006, e.g., etalon; a detector 1020, a processor 1030 and memory 1034. Also shown is a separate wavelength meter or detector which may be used in an embodiment of the invention for the programming of the system to determine absolute wavelengths of the output beam 1004 from the laser 1000. The interference element 1006 is positioned in the path of the output beam 1004 at an angle to the optical path of the beam. A first portion of the beam is reflected off the front surface 1010 of the interference element along optical path 1012 toward detector 1020. A second portion of the beam is transmitted through the front surface of the interference element and is reflected off the back surface 1008 of that element along an optical path 1014 toward the detector 1020. Because the path length traveled by the two reflected beams to a given point in space are different, the two reflected beams constructively and destructively interfere across the surface of the detector 1020. A plurality of detectors 1022–1026 are positioned on the detector surface within an overlapping region of the reflected and refracted beams. They are positioned to measure the slope of the fringe pattern produced by the constructive and destructive interference of the reflected and refractive beam at two distinct locations. The detectors, in combination with processor 1030 in which they are coupled, generate a first and second signal phase shifted with respect to one another. The signals correlate with two distinct slopes of the fringe pattern. A phase shift of approximately 90 degrees between the two signals is preferred.

Utilizing program code 1032 stored in memory 1034, the processor 1030 makes relative and/or absolute wavelength determinations. These may be displayed or utilized as part of a control circuit for locking and/or sweeping the optical signal generator. The processor 1030 is coupled to the optical signal generator 1000, in an embodiment of the invention, in which closed loop control of output wavelength is implemented. In that embodiment of the invention, the CPU, using wavelength determination provided by the scanning interferometer, tunes the laser using either mechanical tuning, current tuning, or temperature tuning. In still another embodiment of the invention, the processor receives input directly from a wavelength meter during assembly or on start-up to correlate specific ratios of the first and second signals with an output wavelength of the laser.

In still another embodiment of the invention, the output wavelength of the laser is determined by precise fabrication and positioning of all elements of the system including laser, interference element and photodetectors so as to obviate the use of wavelength meter 1040 for initial device calibration.

In still another embodiment of the invention, the output wavelength of the laser may be determined in an absolute sense by techniques set forth in the following discussion that sets forth the parameters required to mathematically correlate the conversion of signals 1–2 to an absolute wavelength determination. In the example shown, the signals correspond to two slopes of the fringe pattern generated from locations which are separated by a distance of one-fourth the periodicity interval of the fringe pattern, although modifications to the equations will allow accurate wavelength determination even if the phase separation is significantly different.

The signals as a function of wavelength look like:

$$\text{Signal\_1} = K \cdot \sin\left(\frac{2 \cdot \pi \cdot \lambda}{\Lambda}\right); \text{ and } \text{Signal\_2} = K \cdot \cos\left(\frac{2 \cdot \pi \cdot \lambda}{\Lambda}\right)$$

where K is proportional to the incident optical power, $\lambda$ is the wavelength of concern, and $\Lambda$ is the periodicity of the detected signal in wavelength, which is governed by the etalon thickness and incidence angle between optical beam and the etalon. Wavelength can be determined from the following Equation 3;

$$\lambda = \left(\frac{\Lambda}{2 \cdot \pi}\right) \cdot \text{Tan}^{-1}\left(\frac{\text{Signal\_1}}{\text{Signal\_2}}\right) + n\Lambda \qquad \text{Equation 3}$$

which removes the dependence of wavelength on K by taking the ratio of two distinct slope samples. Here n is an integer indicating that the wavelength may be any multiple of the fixed periodicity of the measurement device. Changes in wavelength can be determined from Signals 1 and 2 simply by taking their ratio. Additionally, where the inverse tangent is taken, a linear correspondence may be established between Signals 1 and 2 and the output wavelength of the laser. Where the periodicity $\Lambda$ for the device is known, a properly scaled linear relation may be established between Signals 1 and 2 and the output wavelength of the laser. Because the inverse tangent in Equation 3 has a singularity when Signal_2 reaches zero, the processing may be further modified to avoid a divide by zero. The following Equation 4 provides such a solution.

$$\lambda = \left(\frac{\Lambda}{2 \cdot \pi}\right) \cdot \text{Tan}^{-1}\left(\frac{\text{Signal\_1}}{\text{Signal\_2}}\right) + n\Lambda \text{ if Signal\_1} > \text{Signal\_2} \quad \text{Equation 4}$$

$$\lambda = \left(\frac{\Lambda}{2 \cdot \pi}\right) \cdot \text{Cot}^{-1}\left(\frac{\text{Signal\_2}}{\text{Signal\_1}}\right) + n\Lambda \text{ if Signal\_2} > \text{Signal\_1}$$

In still another embodiment of the invention, absolute wavelength, as opposed to relative wavelength, may be determined using a single entry or a lookup table stored in memory 1034. That entry or table correlates absolute wavelength with the magnitude and/or sign and magnitude of Signals 1 and 2, as will be discussed further in FIG. 13.

In still another embodiment of the invention, the detectors 1022–1026 may be replaced by a suitable interface for coupling the beam 1012–1014 to an external detector. The coupling may include a fiber optic. Similarly the laser 1000 may be external to the scanning interferometer. In this embodiment the output beam would be coupled to the scanning interferometer. The coupling may include a fiber optic.

In still another embodiment of the invention, the interfering beams may be derived from multiple reflections within the interference element, which both pass through to an alternative detector placed beyond the interference element.

In still another embodiment of the invention, a lens may be inserted between the coupled light source and the interference element for purposes of adjusting the rate of divergence of the optical beam.

Figure 11:
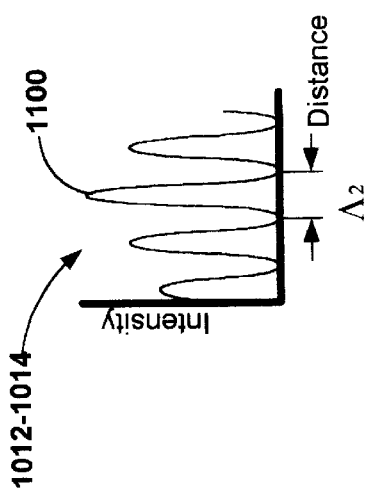
FIG. 11 is a graph of intensity versus position for the fringe pattern. The fringe pattern has a spatial periodicity $\Lambda_2$.

FIG. 11 is a graph of intensity versus position for the fringe pattern. The fringe pattern has a spatial periodicity $\Lambda_2$. To a first degree, approximation of the periodicity is substantially constant across a wide range of wavelengths. The variation in the fringe pattern that occurs during wavelength variations of the output beam is therefore primarily one of a positive/negative movement on the "x", i.e., distance axis. By measuring the slope of the fringe pattern at two distinct locations, the scanning interferometer system of the current invention is able to provide relative and/or absolute wavelength readouts which are accurate even during power variations of the laser beam. Since wavelength variations in optical signal generators are almost always accompanied by power variations, this feature of the invention is necessary in order to provide an effective device for test/measurement/control/locking of optical systems. Furthermore, the measurement of the slope of the fringe pattern at two distinct locations improves the accuracy of wavelength determination.

In an alternate embodiment of the invention the interference element may be wedge shaped to reduce the form factor of the combined system. In still another embodiment of the invention the detector may be positioned on the opposite side of the interference element from the laser. In this embodiment, it is advantageous that both surfaces 1008–1010 of the interference element 1006 be partially reflective in order to balance the relative intensities of the internally reflected-transmitted and transmitted beams.

Figure 12:
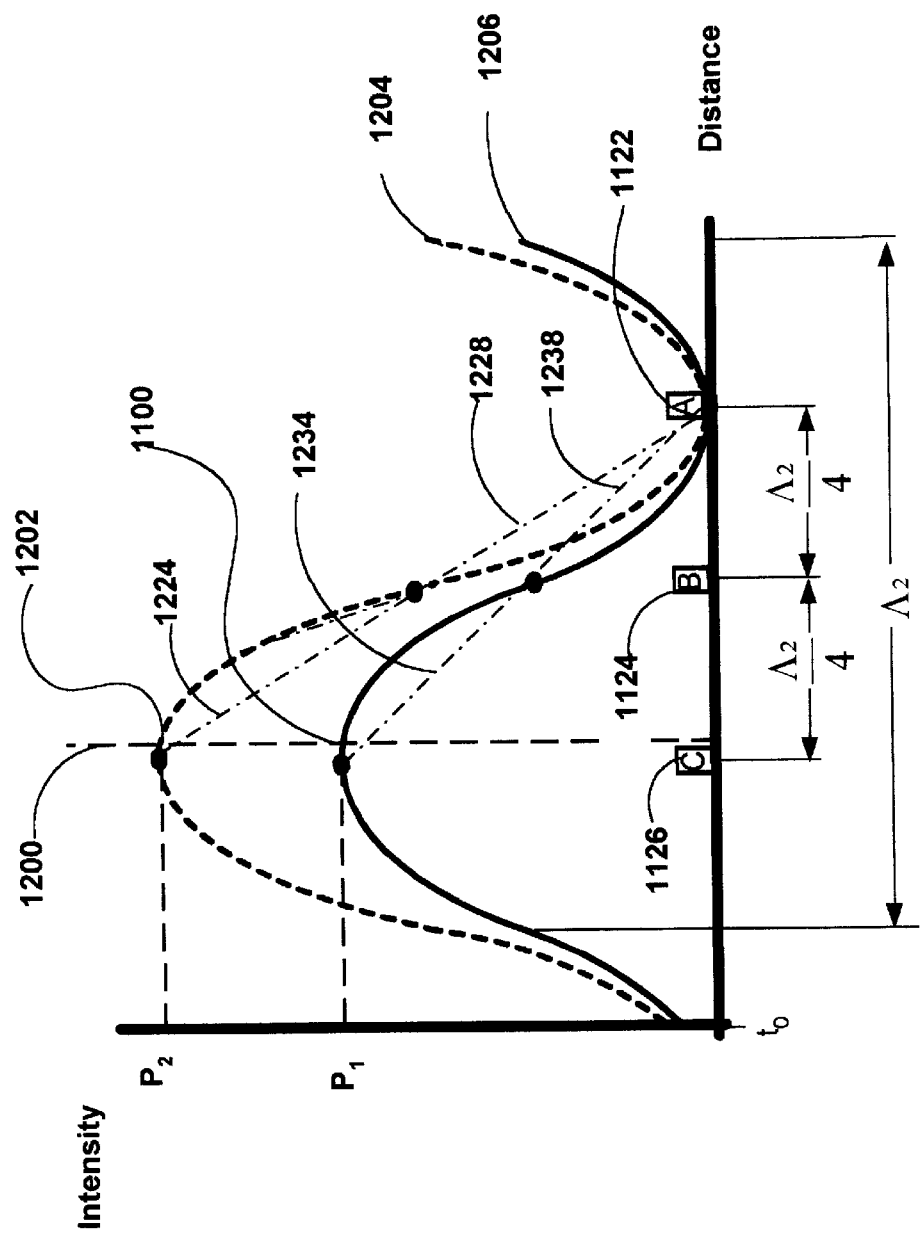
FIG. 12 is a graph of intensity versus position.

FIG. 12 is a graph of intensity versus position. Two separate fringe patterns 1204–1206, with local maxima 1202, 1100 at the same location 1200 are shown. A laser with a constant wavelength and a time varying output intensity might produce these variations in the local maxima.

Figure 13:
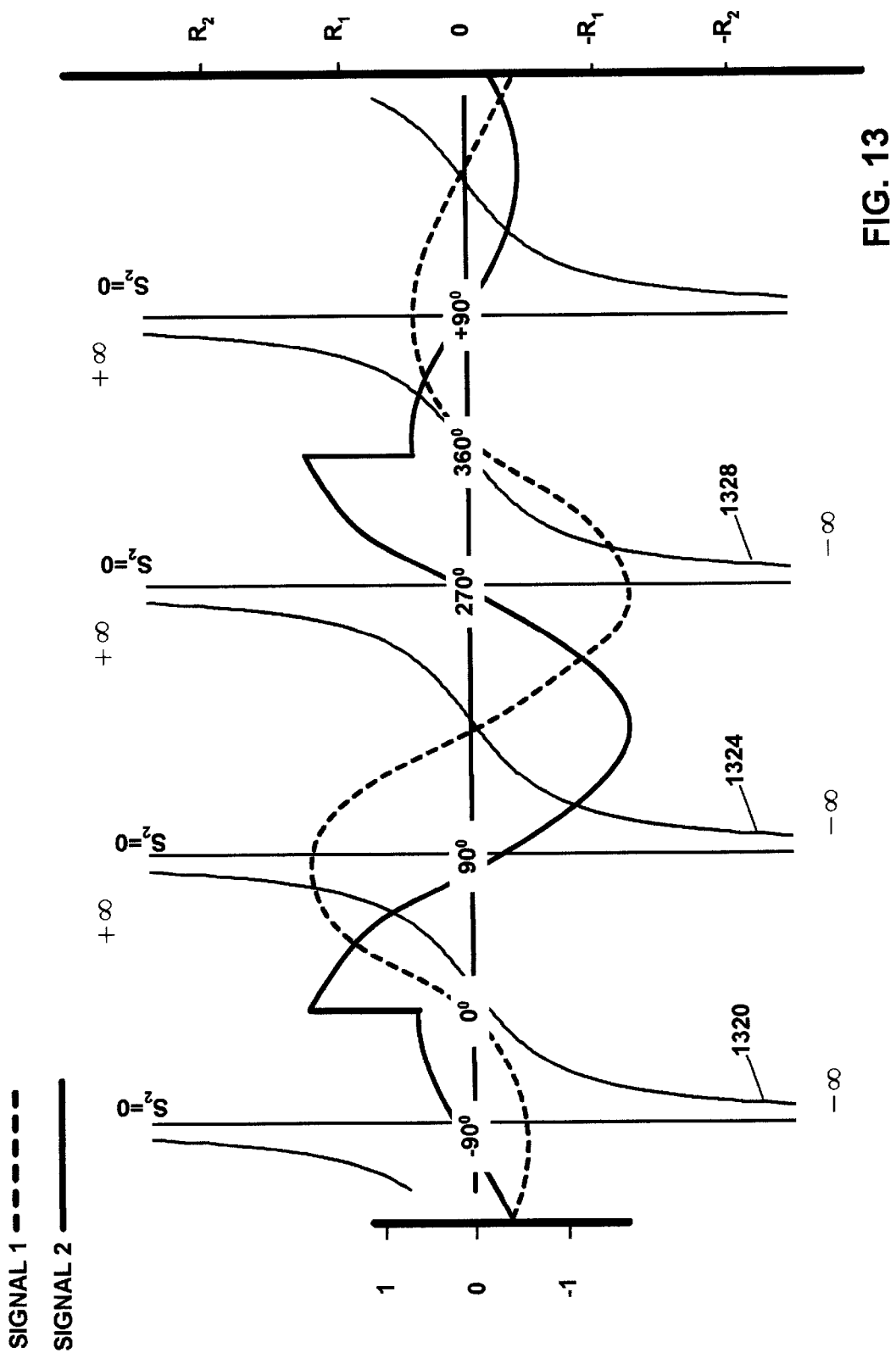
FIG. 13 is a graph of both the difference Signals 1 and 2 and the signal corresponding to the ratio of Signals 1 and 2.
Figure 14:
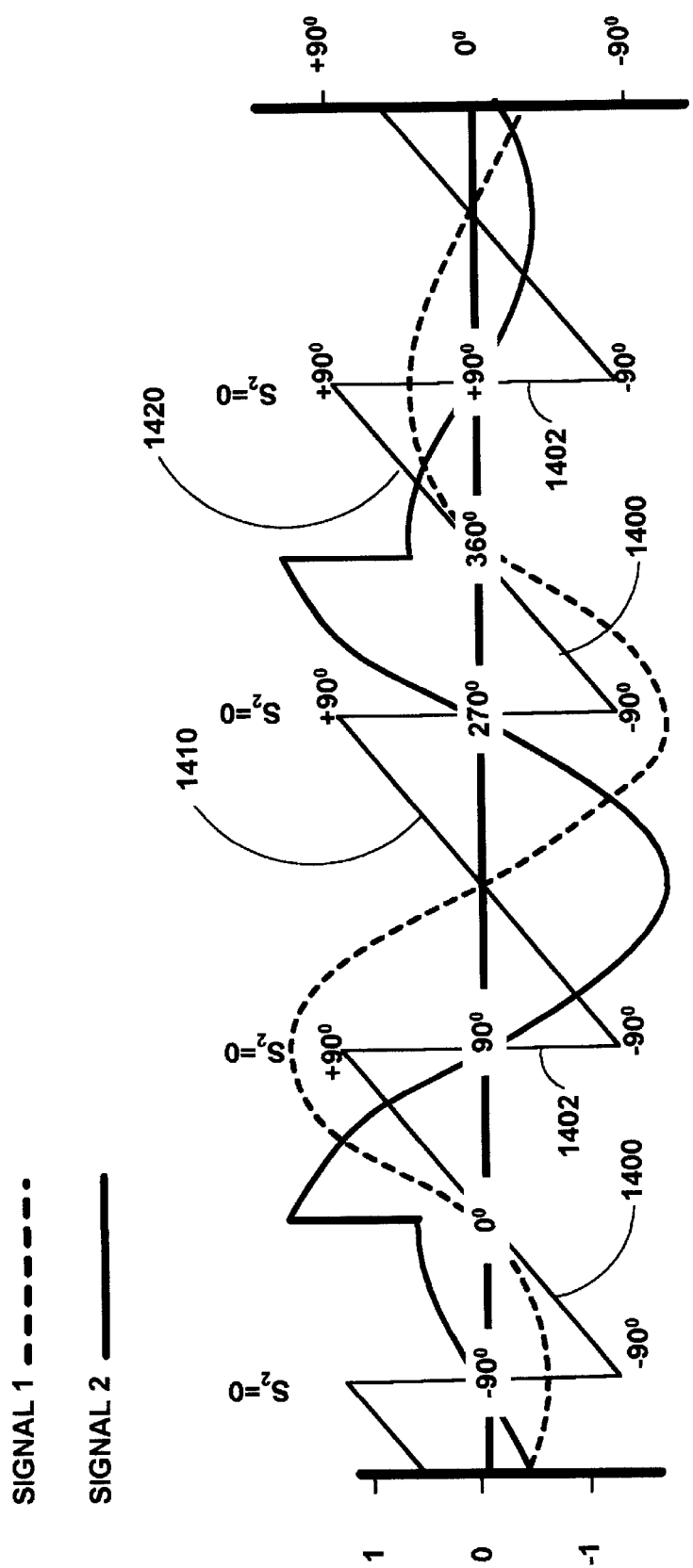
FIG. 14 is a graph identical to that shown in FIG. 13, with the exception that the ratio signal shown in FIG. 13
Figure 15:
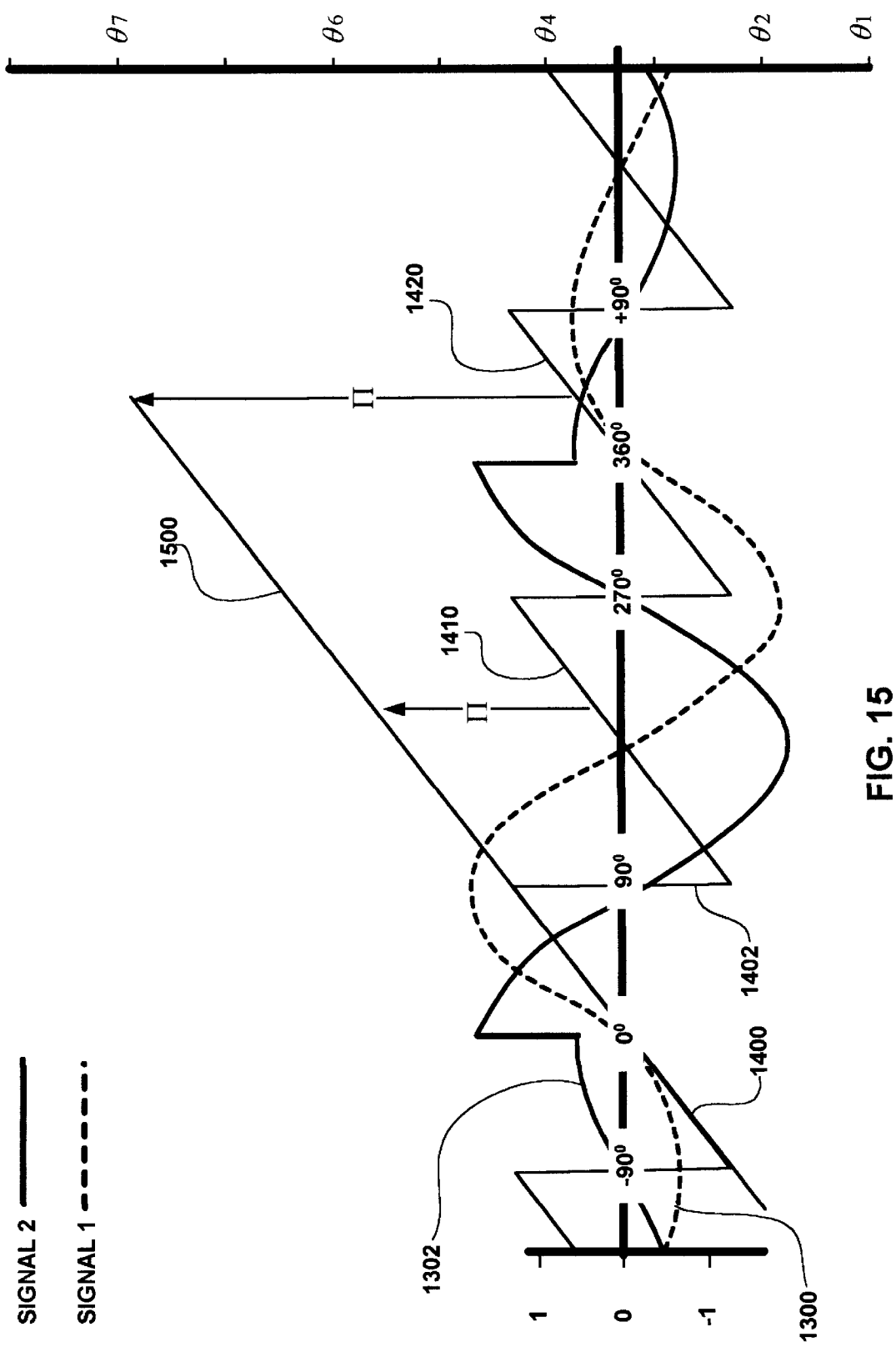
FIG. 15 is a graph identical to that shown in FIG. 13 with the addition of a composite arctangent signal 1500, which exhibits none of the discontinuities of the pure arctangent function.

The detectors and associated logic of the current invention provide the same readout during variations in the intensity of the fringe pattern, as will be shown in this figure and the following FIGS. 13–15. The intensity of fringe pattern 1204 at local maximum 1202 is $P_2$. The intensity of fringe pattern 1206 at local maxima 1100 is $P_1$. The fringe patterns are both generally sinusoidal and have the same periodicity $\Lambda_2$. The detectors 1022–1026 shown in FIG. 10 are superimposed on the "x" axis of the graph at desirable locations with respect to one another, as determined by the periodicity $\Lambda_2$ of the fringe pattern. In the embodiment shown, the three detectors are each separated from one another by distances equal to one-fourth of the periodicity $\Lambda_2$. The variations in intensity between fringe pattern 1206 and 1204 result in different intensity measurements from detectors 1124–1126. Only detector 1122 is unaffected by power variations because it happens to lie at a local minima of both fringe patterns. Since no movement in a positive or negative "x" direction is shown the output wavelength of the laser is stable despite the intensity variations in the Tinge pattern. The utility of the combined detectors and logic of the current invention is that they provide the same resultant output signal despite variations in output power. This result is achieved by logic which generates two signals, i.e., Signals 1 and 2, corresponding respectively to the difference in the measured intensity at detectors 1122–1124 and 1124–1126. These signals individually are affected by power variations, but the next processing step removes this dependence. That processing step involves obtaining the ratio of the signals. The ratio of these differences may reliably be used for measurement, control or locking of the output wavelength of an optical source.

The difference signal produced by detector pair 1122–1124 corresponds to the slopes 1228,1238 of each of fringe patterns 1204–1206. The difference signal produced by detector pair 1124–1126 corresponds to the slopes 1224, 1234 of each of fringe patterns 1204–1206. Although the slopes vary with intensity, their ratio does not. The scanning interferometer of the current invention will give a consistent readout of wavelength even in the presence of power variations in the fringe pattern.

Figure 16:
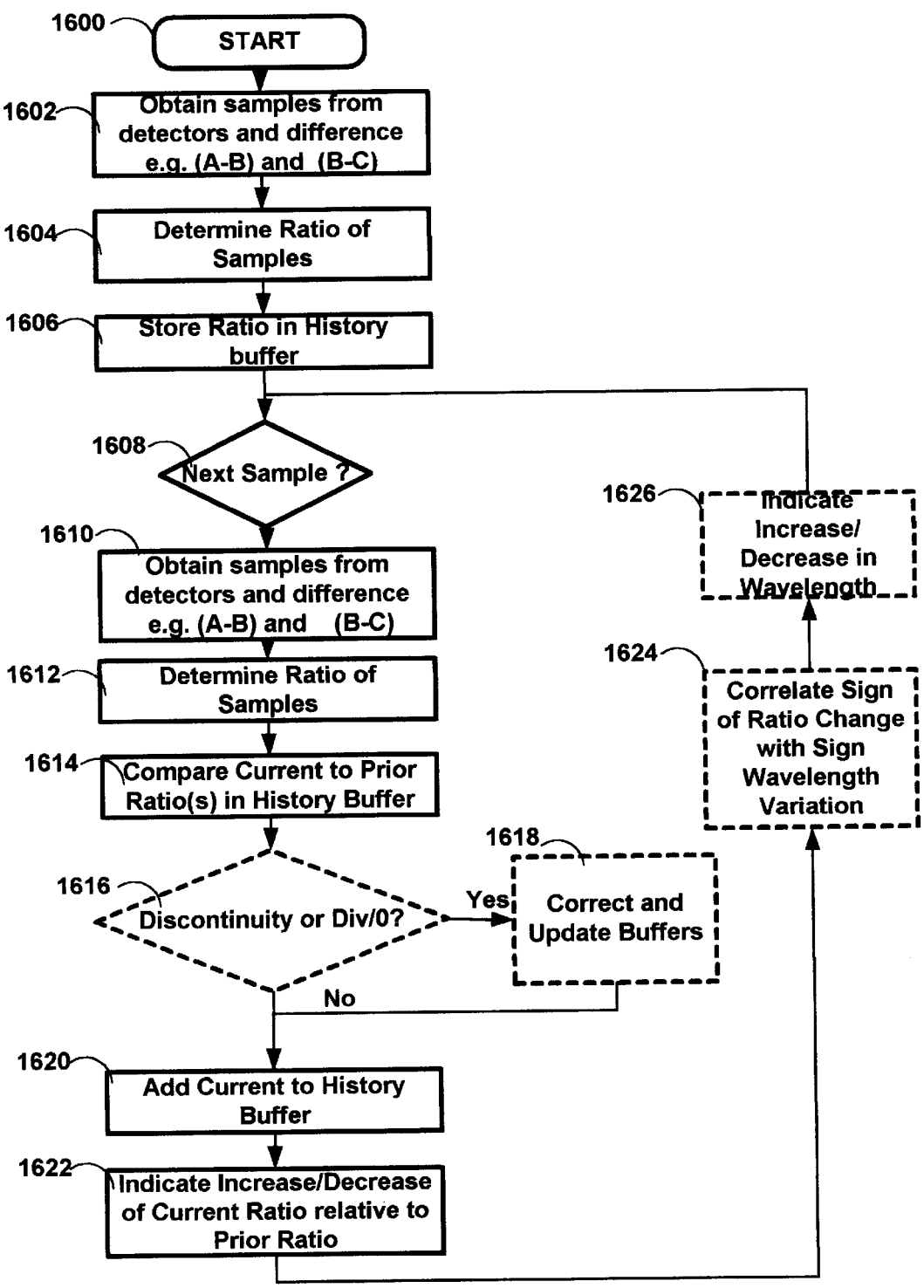
FIG. 16 is a process flow diagram showing the processes implemented by processor 1030 (See FIG. 10) for relative wavelength determination using the ratio signal shown in FIG. 13.
Figure 17:
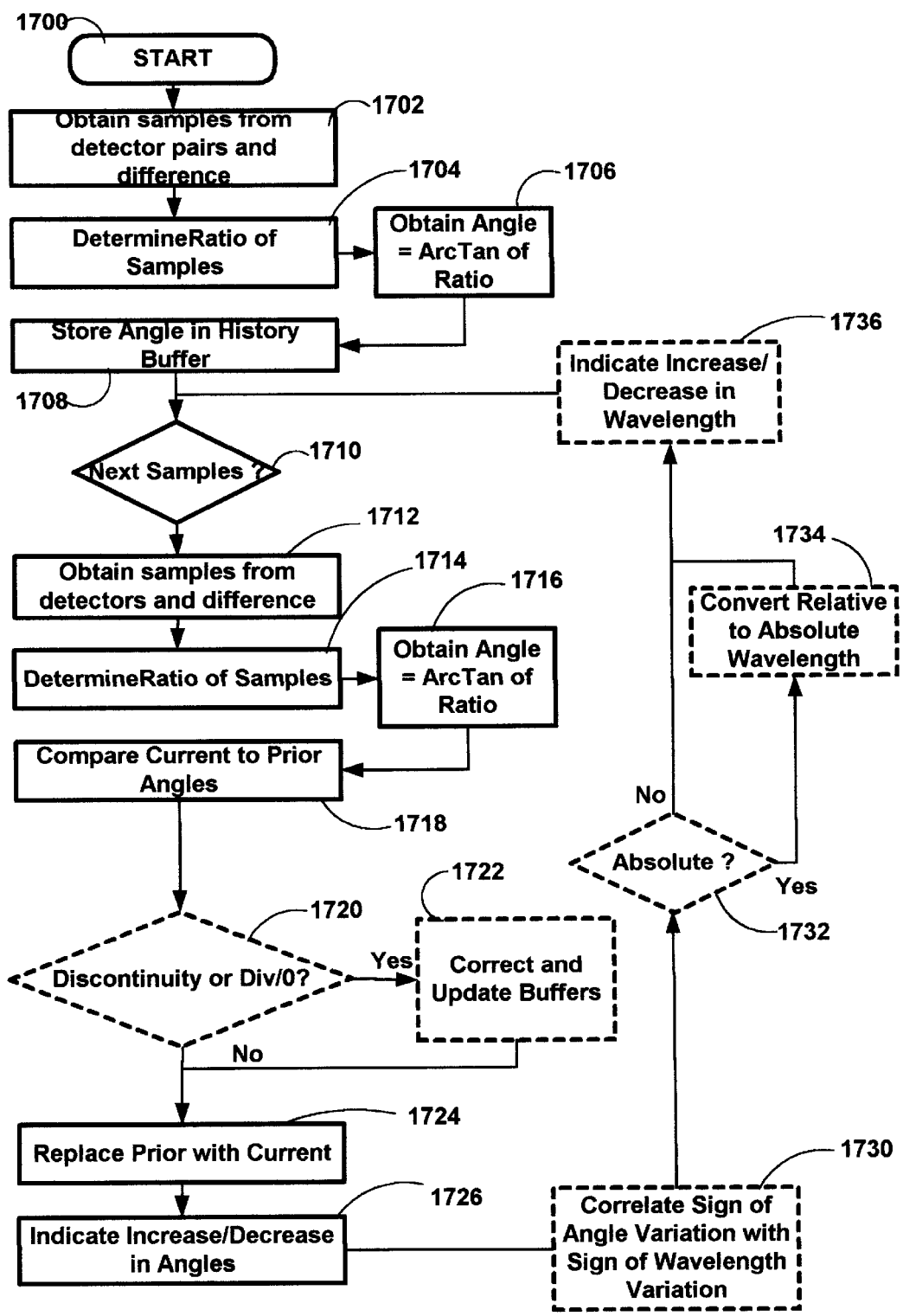
FIG. 17 is a process flow diagram showing the processes implemented by processor 1030 (See FIG. 10) for relative and/or absolute wavelength determination using the arctangent signal shown in FIG. 14 or the composite arctangent signal shown in FIG. 15.

The dual signals and subsequent processing thereof provide additional advantages over prior art devices (See FIGS. 16–17).

First, the scanning interferometer of the current invention may be used across any wavelength range as will be shown in the following FIGS. 13–17. This results in part from the fact that a opposed to single or dual sensor devices, the current device may be uniformly sensitive across a wide wavelength range. Prior art devices which use one or two sensors can only be used for wavelength locking since they do not provide uniform feedback signals over a wide tuning range, i.e., the sensitivity of one or two sensor devices vary substantially across the peaks and valleys of a fringe pattern.

Second, in the embodiment of the current invention shown in FIGS. 14–16 and 17, the feedback signal is linear across a broad wavelength range. Prior art devices do not exhibit such linearity of feedback.

Third, single or dual sensor arrays provide little precision in wavelength control when they happen at the wavelength of interest to fall under a peak or valley of fringe pattern intensity. In these locations, the sensor will be largely insensitive to wavelength variations since the slope at a fringe peak/valley is zero. In the current device, the detectors may be positioned less precisely with respect to the fringe pattern than is the case with single or dual sensors. In the current device the insensitivity of one detector pair positioned on or around a peak or valley in the fringe pattern at a given wavelength is offset by the increased wavelength sensitivity of the other detector pair which is then positioned on a high slope portion of the fringe pattern.

FIG. 13 is a graph of both the difference Signals 1 and 2 and the signal corresponding to the ratio of Signals 1 and 2. The "x" axis of the graph shows the periodicity of the difference and ratio signals. The scale of the "x" axis is proportional to the wavelength by the relation $\theta=360*\lambda/\Lambda$. The first "y" axis shows the magnitude of Signals 1 and 2. The second "y" axis shows the magnitude of the ratio signal. Signals 1 and 2 correspond to the difference in fringe intensity measured by detector pairs 1122–1124 and 1124–1126, respectively. Signal 1 is shown in dotted line while Signal 2 is shown in solid. The signals are sinusoidal with a phase shift of approximately 90 degrees. Positioning of the detectors determines the phase shift between the signals, with 90 being a preferred phase. At this phase shift, both precision and insensitivity to noise are maximized. Other phase shifts in Signals 1 and 2 are acceptable to the extent that Signals 1 and 2 are not identical.

The ratio signal corresponds to a tangent function which is infinite-valued at odd integer multiples of 90 degrees at which Signal 2 is 0. Nevertheless, the ratio signal exhibits complete independence from power fluctuations in Signals 1 and 2. In the example shown, both signals 1 and 2 exhibit a doubling in amplitude over the interval from 0° to 90°, yet the ratio signal variously referenced as 1320, 1324, 1328 does not vary with these fluctuations in amplitude. Where it is not infinite-valued, the ratio signal varies monotonically with wavelength variations in the output beam of the laser. Although it is not linearly related to wavelength variations across a wide range, nevertheless it may be used to indicate a change in wavelength, or as part of a wavelength control or locking circuit for an optical source.

FIG. 14 is a graph identical to that shown in FIG. 13, with the exception that the ratio signal shown in FIG. 13 has been replaced with its arctangent. This additional process has the benefit of linearizing the ratio signal. The arctangent signal exhibits linear regions 1400, 1410, 1420 for angles between −90° to 90°, 90° to 270°, and 270° to 90°, respectively. Discontinuities occur, as in the ratio signal at odd integer multiples of 90°. The arctangent signal varies directly or inversely with wavelength variations in the output beam of the laser. Because it is linearly correlated with wavelength variations in the laser output beam, the arctangent of the ratio signal may be used across a wide range of wavelengths for both relative and absolute wavelength control for an optical source. Other trigonometric functions, e.g., the cotangent function, may be substituted for the arctangent function without departing from the scope of the invention. In a different embodiment of the invention, the ratio can be used as an index into a lookup table of wavelength values stored in memory 1034 by pre-calculating or measuring the relationship between wavelength and ratio during device calibration.

FIG. 15 is a graph identical to that shown in FIG. 13 with the addition of a composite arctangent signal 1500, which exhibits none of the discontinuities of the pure arctangent function. This composite signal is produced by processes set forth in this and the following FIG. 17, which involve the following steps. First, logic is provided for detecting discontinuities in the arctangent function resulting from the zero crossing of whichever signal is in the denominator. The divide by zero is avoided. Second, a determination is made as to whether the next measured arctangent crosses a boundary, e.g., odd integer multiples of 90°. When a boundary is crossed in one direction, the arctangent values for the next segment are increased by 180° and so on for each segment, thereby removing the discontinuity and producing the composite arctangent signal. This stacking is represented on the graph by the addition of 180° linear segment 1410 of the arctangent function between 90° and 270° and the addition of 180° multiplied by two, or 360° to the next segment 1420. The processes discussed above are a variant of the quadrant-sensitive form of the arctangent function which observes the relative magnitudes of the two signals making up the ratio and does not necessitate processor functions which observe for boundary crossings. In an alternate embodiment of the invention, these processes may be utilized to avoid discontinuities.

Because it is linearly correlated with wavelength variations of the laser output beam, and because it does not exhibit discontinuities, the composite arctangent signal may be used across a wide range of wavelengths for both relative and absolute wavelength control for an optical source. Other trigonometric functions, e.g., the cotangent function, may be substituted for the arctangent function without departing from the scope of the invention.

FIGS. 16–17 are process flow diagrams showing iterative processes for determining wavelength variations either in relative or absolute terms. In another embodiment of the invention absolute wavelength determination may be made using either a lookup table programmed with parameters derived during the design or assembly of the device. Where precise fabrication of the device is possible, the parameters set forth in the above mentioned Equation 3 will be ascertainable. In that event each signal ratio or angle can be correlated to an absolute output wavelength of the optical beam. Alternately, where the parameters listed in Equations 3 are not known, a lookup table may be generated for a specific device or for all devices of similar design features which correlates signal ratios or angles with an absolute wavelength of the optical beam. The lookup table may be generated using an external wavelength monitor temporarily coupled to the optical signal source and the processor to measure for each output wavelengths the corresponding ratios or angles and to record these in the lookup table.

FIG. 16 is a process flow diagram showing the processes implemented by processor 1030 (See FIG. 10) for relative wavelength determination using the ratio signal shown in FIG. 13. Processing begins at start block 1600 in which the system is initialized. Control is then passed to process 1602. In process 1602 the outputs of the detectors 1122–1124 and 1124–1126 is differenced (See FIG. 12). Control is then passed to process 1604. In process 1604 the ratio of the sampled differences is calculated. Control is then passed to process 1606. In process 1606 the ratio determined in the prior process is stored in a history buffer. Control is then passed to decision process 1608. In decision process 1608 a determination is made as to whether a next sampling interval is indicated. At the onset of the next sampling interval control is passed to process 1610.

In process 1610 the next sampling of the detectors is conducted and their difference is determined. Control is then passed to process 1612. In process 1612 the ratio of the differences is determined. Then control is passed to process 1614. In process 1614 the ratio calculated in process 1612 is compared to prior ratio(s) calculated. Control is then passed either directly to process 1620 or to optional decision process 1616.

In decision process 1616 a determination is made as to whether a discontinuity, i.e., divide by zero occurred in process 1612. Where such a condition is present, control is then passed to process 1618. In process 1618 the divide by zero situation is avoided either by substitution of a finite and small denominator or by discarding the calculated ratio. Any corrections to the history buffer that are required are made. Control is then returned to process 1620.

In process 1620 the ratio obtained in process 1612 is placed in the history buffer. Control then passes to process 1622. In process 1622 an indication is made as to whether the current ratio represents an increase or decrease in magnitude over the prior ratio. Control is then passed to optional processes 1624 and 1626. In process 1624 a correlation is developed between the sign of the ratio change indicated in process 1622 and a corresponding sign of the wavelength variation of the output beam of the laser. This determination may be made utilizing parameters stored in memory 1034. Where the scanning interferometer is used for wavelength control, the control loop may be used to learn the required relationship on the fly. In this embodiment of the invention control signals are applied to the laser to vary its wavelength in what is believed to be the appropriate direction. That decision is tentative and is analyzed on the next sample pass by determining the incremental change in the ratio. If the incremental change increases the measured error, then the sign of the control signal is reversed, thereby correlating the sign of the wavelength variation with the sign of the change in the current versus prior ratio signals. Control then passes to process 1626 in which the relative increase or decrease in wavelength may be utilized for locking the output beam of the laser on a fixed wavelength or for tuning the laser within a narrow range. Control then returns to decision process 1608 for the onset of the next sampling interval.

FIG. 17 is a process flow diagram showing the processes implemented by processor 1030 (See FIG. 10) for relative and/or absolute wavelength determination using the arctangent signal shown in FIG. 14 or the composite arctangent signal shown in FIG. 15. Processing begins at start block 1700 in which the system is initialized. Control is then passed to process 1702. In process 1702 the outputs of the detectors 1122–1124 and 1124–1126 is differenced (See FIG. 12). Control is then passed to process 1704. In process 1704 the ratio of the sampled differences is calculated. Control is then passed process 1706. In process 1706 the arctangent of the ratio is computed. Then control passes to process 1708. In process 1708 the angle determined in the prior process is stored in a history buffer. Control is then passed to decision process 1708.

In decision process 1710 a determination is made as to whether next sampling interval is indicated. At the onset of the next sampling interval control is passed process 1712. In process 1712 the next sampling of the detectors is conducted and their difference is determined. Control is then passed to process 1714. In process 1714 the ratio of the differences is determined. Control is then passed to process 1716. In process 1716 the arctangent of the ratio is computed. Then control is passed to process 1718. In process 1718 the angle calculated in process 1712 is compared to prior angle(s) stored in the history buffer. Control is then passed either directly to process 1724 or to optional decision process 1720.

In decision process 1720 a determination is made as to whether a discontinuity, i.e. divide by zero occurred in process 1714. Where such a condition is present control is then passed to process 1722. In process 1722 the divide by zero situation may be avoided using any one of a number of processing techniques. In a first embodiment of the invention the divide by zero is avoided by solving for the angle using the arccotangent function instead of the arctangent function. In alternate embodiments of the invention the divide by zero is avoided eider by substitution of a finite and small denominator or by discarding the calculated ratio. Any corrections to the history buffer that are required are made. Control is then returned to process 1724.

In process 1724 the angle obtained in process 1716 is placed in the history buffer. Control then passes to process 1726. In process 1726 an indication is made as to whether the current angle represents an increase or decrease in magnitude over the prior angle. Control is then passed to optional processes 1730–1736. In process 1730 a correlation is developed between the sign of the angle change indicated in process 1726 and a corresponding sign of the wavelength variation of the output beam of the laser. This determination may be made utilizing parameters stored in memory 1034. Where the scanning interferometer is used for wavelength control, the control loop may be used to learn the required relationship on the fly. In this embodiment of the invention control signals are applied to the laser to vary its wavelength in what is believed to be the appropriate direction. That decision is tentative and is analyzed on the next sample pass by determining the incremental change in the ratio. If the incremental change increases the measured error then the sign of the control signal is reversed, thereby correlating the sign of the wavelength variation with the sign of the change in the current versus prior ratio signals. Control then passes to decision process 1732 in which a determination is made as to whether to implement absolute as opposed to relative wavelength determination. If the decision is negative control passed directly to process 1736. Alternately, if the decision is to implement absolute wavelength determination then control is passed to process 1734, In process 1734 parameters stored in memory as a single entry or set of entries and which correlate the measured angle determined in process 1716 with an absolute wavelength of the output beam of the laser are retrieved. These parameters may have been input at time of assembly of the laser and scanning interferometer using the external wavelength meter 1040. Alternately, they may be determined based on a wavelength determination made during start up from a reference gas cell, or other wavelength selective reference coupled to the output beam of the laser. In an alternate embodiment of the invention the parameters may be a theoretical model from which the combined laser and interferometer is designed. In any event once the absolute wavelength is determined control is then passed to process 1736. In process 1736 either relative or absolute wavelength., may be utilized, for measurement, control, tuning, or locking of the output wavelength of the tunable laser, or other devices of which the laser and scanning interferometer are a part. Control then returns to decision process 1710 for the onset of the next sampling interval.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for monitoring wavelength in an optical beam generated by an optical source;
   an interference element positioned in the path of the optical beam to generate a generally periodic fringe pattern;
   detectors located within the generally periodic fringe pattern to generate signals corresponding to the intensities of the fringe pattern at a plurality of locations; and
   logic coupled to said detectors for sampling two selected pairs of the signals generated by the detectors, for determining a ratio of the differences of the two selected pairs of the signals, and for comparing a current ratio with a prior ratio to detect a variation in the wavelength of the optical beam generated by the optical source.

2. The apparatus of claim 1, further comprising: logic for converting the ratio to an angle and for comparing a current angle to a prior angle to detect a variation in the wavelength of the optical beam generated by the optical source.

3. The apparatus of claim 2, wherein the logic for converting the ratio to an angle further comprises at least one of logic generating an arctangent of the ratio and logic for generating an arccotangent of the ratio.

4. The apparatus of claim 2, further comprising logic for avoiding discontinuities between a current angle and a prior angle.

5. The apparatus of claim 2, further comprising logic for removing discontinuities between a current angle and a prior angle by adding an integer multiple of 90° to one of the current angle and the prior angle when a discontinuity is detected.

6. The apparatus of claim 1, further comprising:
control logic coupled to said logic coupled to said detectors and to the optical source, and said control logic for controlling the wavelength variation in the optical source on the basis of the comparing of the current ratio with the prior ratio.

7. The apparatus of claim 1, wherein said interference element comprises at least one of an air-gap etalon and a solid etalon.

8. The apparatus of claim 1, wherein said detectors include at least three photodetectors spaced apart from one another and wherein further said logic coupled to said detectors determines the ratio of the differences of the signals generated by the first together with the second detector and the second together with the third detector.

9. The apparatus of claim 1, further comprising:
a memory coupled to said logic and containing parameters correlating variations in the current ratio and the prior ratio with the wavelength variation in the optical beam.

10. An apparatus for monitoring wavelength in an optical beam generated by an optical source;
means for generating a generally periodic fringe pattern of the optical beam;
means for generating signals corresponding to intensities of the generally periodic fringe pattern at a plurality of locations; and
logic coupled to said means for generating and for sampling two selected pairs of the signals, for determining a ratio of the differences of the two selected pairs of the signals, and for comparing a current ratio with a prior ratio to detect a variation in the wavelength of the optical beam generated by the optical source.

11. A method for monitoring wavelength in an optical beam generated by an optical source, and the method for monitoring comprising the acts of;
generating a generally periodic fringe pattern of the optical beam;
generating signals corresponding to the intensities of the fringe pattern at a plurality of locations;
iteratively sampling two selected pairs of the signals generated in said act of generating signals;
determining a ratio of the differences of the two selected pairs of the signals; and
comparing a current ratio with a prior ratio to detect a variation in the wavelength of the optical beam generated by the optical source.

12. The method of claim 11, further comprising the act of:
converting the ratio to an angle; and
comparing a current angle to a prior angle to detect a variation in the wavelength of the optical beam generated by the optical source.

13. The method of claim 12, wherein the act of converting the ratio to an angle further comprising the act of:
generating at least one of an arctangent of the ratio and an arccotangent of the ratio.

14. The method of claim 12, further comprising the act of:
avoiding discontinuities between a current angle and a prior angle.

15. The method of claim 12, further comprising the act of:
removing discontinuities between a current angle and a prior angle by adding an integer multiple of 90° to one of the current angle and the prior angle when a discontinuities is detected.

16. The method of claim 10, further comprising the act of:
controlling the wavelength variation in the optical source on the basis of the comparing of the current ratio with the prior ratio.

17. An apparatus for monitoring wavelength in an optical beam generated by an optical source;
an interference element positioned in the path of the optical beam to generate a generally periodic fringe pattern;
detectors located within the generally periodic fringe pattern to generate signals corresponding to the intensities of the fringe pattern at a plurality of locations; and
logic coupled to said detectors for sampling two selected pairs of the signals generated by the detectors, for determining a ratio of the differences of the two selected pairs of the signals, and for calculating the wavelength of the optical beam based on parameters which correlate the ratio with wavelength.

18. An apparatus for monitoring wavelength in an optical beam generated by an optical source, and the apparatus for monitoring comprising;
a beam splitter positioned in the path of the optical beam to split the optical beam into a first and a second beam;
a stationary reflector positioned in an optical path of the second beam;
a movable reflector oscillating over a known distance along an optical path of the first beam to vary an optical path length of the first beam with the movable reflector including;
a) a semiconductor base; and
b) a reflective element flexibly coupled to the semiconductor base and movable responsive to one of a voltage and a current applied between said semiconductor base and said reflective element;
a detector for detecting interference fringes generated by a combination of a portion of the first beam reflected by said movable reflector and a portion of the second beam reflected by said stationary reflector, and to generate an AC signal corresponding thereto; and
logic for sampling the AC signal and determining at least one of a relative wavelength and an absolute wavelength of the optical beam based on the AC signal and the known distance of the reflector.

19. The apparatus for monitoring wavelength of claim 18, wherein said logic further comprises:
logic for detecting a distance traveled by said movable reflector after the detection of a peak in the AC signal.

20. The apparatus for monitoring wavelength of claim 18, wherein the optical path length of the first beam equals the optical path length of the second beam at least once during each oscillation of the movable reflector.

21. An integrated circuit optical signal generator comprising:
   a semiconductor substrate;
   a semiconductor laser integral with said semiconductor substrate and said semiconductor laser for emitting an optical beam;
   a semiconductor photo detector defined on said semiconductor substrate;
   a beam splitter defined on said semiconductor substrate and positioned in the path of the optical beam to split the optical beam into a first and a second beam;
   a stationary reflector defined on said semiconductor substrate and positioned in an optical path of the second beam;
   a reflective element flexibly coupled to said semiconductor substrate and movable responsive to one of a voltage and a current applied between said semiconductor substrate and said reflective element to oscillate over a known distance along an optical path of the first beam to vary an optical path length of the first beam; and
   a detector for detecting interference fringes generated by a combination of a portion of the first beam reflected by said reflective element and a portion of the second beam reflected by said stationary reflector, and to generate an AC signal corresponding thereto.

* * * * *

UNITED STATES PATENT AND TRADEMARK OFFICE
CERTIFICATE OF CORRECTION

PATENT NO. : 6,331,892, B1
DATED : December 18, 2001
INVENTOR(S) : Evan D. H. Green It is certified that error appears in the above-identified patent and that said Letters Patent is hereby corrected as shown below:

<u>Title page, Item [54] and Column 1, lines 1 and 2,</u>
Title, change "INTERFEROMETER FROM MONITORING WAVELENGTH IN AN OPTICAL BEAM" to -- METHOD AND APPARATUS FOR MONITORING WAVELENGTH IN AN OPTICAL BEAM --

Signed and Sealed this

Twenty-ninth Day of October, 2002

*Attest:*

JAMES E. ROGAN
*Attesting Officer*     *Director of the United States Patent and Trademark Office*